US010755716B2

(12) United States Patent
Somech et al.

(10) Patent No.: US 10,755,716 B2
(45) Date of Patent: Aug. 25, 2020

(54) ASSOCIATING MEETINGS WITH PROJECTS USING CHARACTERISTIC KEYWORDS

(71) Applicant: MICROSOFT TECHNOLOGY LICENSING, LLC, Redmond, WA (US)

(72) Inventors: Haim Somech, Herzliya (IL); Ido Priness, Herzliya (IL); Dikla Dotan-Cohen, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 98 days.

(21) Appl. No.: 15/631,897

(22) Filed: Jun. 23, 2017

(65) Prior Publication Data

US 2018/0218734 A1  Aug. 2, 2018

Related U.S. Application Data

(60) Provisional application No. 62/452,910, filed on Jan. 31, 2017.

(51) Int. Cl.
*G10L 15/22* (2006.01)
*G10L 15/16* (2006.01)
(Continued)

(52) U.S. Cl.
CPC .............. *G10L 15/222* (2013.01); *G06F 8/20* (2013.01); *G06F 8/70* (2013.01); *G06F 9/4451* (2013.01);
(Continued)

(58) Field of Classification Search
CPC . G10L 15/22; G10L 15/1815; G10L 15/1822; G10L 15/265; G10L 15/063;
(Continued)

(56) References Cited

U.S. PATENT DOCUMENTS 6,330,022 B1 * 12/2001 Seligmann ............ H04N 7/147
348/14.08
6,754,874 B1    6/2004 Richman
(Continued)

FOREIGN PATENT DOCUMENTS

WO    2018075372 A1    4/2018

OTHER PUBLICATIONS

"International Search Report and Written Opinion Issued in PCT Application No. PCT/US2018/014607", dated Apr. 3, 2018, 12 Pages.

(Continued)

*Primary Examiner* — Abdelali Serrou

(57) ABSTRACT

Systems and methods are provided for associating meetings with projects. Some implementations include evaluating a similarity between a conversation between two or more users and a set of keywords characterizing at least one project associated with a user of the two or more users, where the conversation is captured by sensor data. Based on the similarity, a listening mode is activated on a user device associated with the user. Contextual information associated with the conversation is generated from portions of the sensor data provided by the activated listening mode. A meeting corresponding to the conversation is assigned to a project associated with the user based on the contextual information. Content is personalized to the user based on the assignment of the meeting to the project.

20 Claims, 6 Drawing Sheets

(51) Int. Cl.

| | |
|---|---|
| *G10L 15/05* | (2013.01) |
| *G10L 15/183* | (2013.01) |
| *G10L 15/07* | (2013.01) |
| *G10L 15/00* | (2013.01) |
| *G06N 20/00* | (2019.01) |
| *G06Q 10/06* | (2012.01) |
| *G06F 9/445* | (2018.01) |
| *G06Q 10/10* | (2012.01) |
| *G06F 8/70* | (2018.01) |
| *G10L 15/26* | (2006.01) |
| *G06F 8/20* | (2018.01) |
| *G10L 15/08* | (2006.01) |
| *G06N 7/02* | (2006.01) |
| *G06F 17/11* | (2006.01) |
| *G06F 9/448* | (2018.01) |
| *G06F 16/93* | (2019.01) |
| *G06F 16/33* | (2019.01) |
| *G10L 15/18* | (2013.01) |
| *G10L 15/065* | (2013.01) |

(52) U.S. Cl.
CPC ....... *G06N 20/00* (2019.01); *G06Q 10/06311* (2013.01); *G06Q 10/06312* (2013.01); *G06Q 10/10* (2013.01); *G10L 15/005* (2013.01); *G10L 15/05* (2013.01); *G10L 15/07* (2013.01); *G10L 15/16* (2013.01); *G10L 15/183* (2013.01); *G10L 15/26* (2013.01); *G06F 9/4498* (2018.02); *G06F 16/3347* (2019.01); *G06F 16/93* (2019.01); *G06F 17/11* (2013.01); *G06N 7/02* (2013.01); *G10L 15/065* (2013.01); *G10L 15/1815* (2013.01); *G10L 2015/088* (2013.01)

(58) Field of Classification Search
CPC ............. G10L 15/08; G10L 2015/0635; G10L 2015/223; G10L 25/78; G10L 13/08; G10L 15/02; G10L 15/065; G10L 15/10; G10L 15/12; G10L 15/183; G10L 15/30; G10L 2015/0638; G10L 2015/088; G10L 2015/225; G10L 2015/227; G10L 2015/228; G10L 13/00; G10L 13/033; G10L 15/01; G10L 15/26; G10L 17/00; G10L 17/22; G10L 2015/226; G10L 2021/02166; G10L 2025/783; G10L 21/0208; G10L 25/48; G10L 25/57; G10L 25/63; G10L 15/222; G10L 15/16; G10L 15/05; G10L 15/07; G10L 15/005; G10L 16/93; G10L 16/3347; G10L 9/4498; G06F 17/30; G06F 17/30011; G06F 17/30616; G06F 17/241; G06F 17/27; G06F 17/2745; G06F 17/3002; G06F 17/30035; G06F 17/30038; G06F 17/30386; G06F 17/30634; G06F 17/30702; G06F 17/30731; G06F 17/30734; G06F 17/30861; G06F 17/30864; G06F 17/30873; G06F 17/30876; G06F 17/30896; G06F 9/4451; G06F 8/70; G06F 16/3347; G06F 8/20; G06F 9/4498; G06F 17/11; G06N 20/00; G06N 7/02; G06Q 10/06312; G06Q 10/06311; G06Q 10/10
See application file for complete search history.

(56) References Cited

U.S. PATENT DOCUMENTS

| | | | |
|---|---|---|---|
| 7,831,582 B1 | 11/2010 | Scofield et al. | |
| 8,135,728 B2 | 3/2012 | Yih et al. | |
| 8,341,175 B2 | 12/2012 | Perantatos et al. | |
| 8,375,034 B2 | 2/2013 | Norton et al. | |
| 8,537,980 B2 | 9/2013 | Frazier et al. | |
| 8,601,054 B2 | 12/2013 | Bagwell et al. | |
| 8,639,552 B1 | 1/2014 | Chen et al. | |
| 8,700,665 B2 | 4/2014 | Beauregard et al. | |
| 8,868,406 B2 | 10/2014 | Tirumalachetty et al. | |
| 9,092,434 B2 | 7/2015 | Kumar et al. | |
| 9,246,693 B2* | 1/2016 | Krantz | H04L 12/1818 |
| 10,135,937 B2* | 11/2018 | Dotan-Cohen | H04L 67/26 |
| 10,164,830 B2* | 12/2018 | Herger | H04L 41/0816 |
| 10,572,858 B2 | 2/2020 | Nelson et al. | |
| 2005/0004825 A1 | 1/2005 | Ehrler et al. | |
| 2005/0108396 A1 | 5/2005 | Bittner | |
| 2005/0138031 A1 | 6/2005 | Wefers | |
| 2006/0053380 A1* | 3/2006 | Spataro | G06F 16/93 715/753 |
| 2006/0064434 A1 | 3/2006 | Gilbert et al. | |
| 2007/0067196 A1 | 3/2007 | Usui | |
| 2007/0192402 A1 | 8/2007 | Dean et al. | |
| 2008/0040126 A1 | 2/2008 | Estrada et al. | |
| 2008/0140782 A1* | 6/2008 | Bagwell | G06F 17/30634 709/206 |
| 2008/0162454 A1 | 7/2008 | Lundell et al. | |
| 2009/0094329 A1* | 4/2009 | Ambati | G06Q 10/10 709/204 |
| 2009/0119246 A1* | 5/2009 | Kansal | G06F 17/30038 |
| 2009/0132329 A1* | 5/2009 | Lam | G06Q 10/06311 705/7.13 |
| 2009/0204470 A1 | 8/2009 | Weyl et al. | |
| 2009/0259718 A1 | 10/2009 | O'Sullivan et al. | |
| 2009/0292580 A1* | 11/2009 | Cross | G06Q 10/06312 705/7.22 |
| 2010/0042600 A1 | 2/2010 | Orr et al. | |
| 2010/0070877 A1* | 3/2010 | Scott | G06Q 10/109 715/751 |
| 2010/0134281 A1 | 6/2010 | Duffy et al. | |
| 2010/0169418 A1* | 7/2010 | Whynot | H04L 67/24 709/204 |
| 2010/0220847 A1* | 9/2010 | Yap | H04M 3/56 379/202.01 |
| 2010/0306018 A1* | 12/2010 | Burtner | G06Q 10/10 705/7.19 |
| 2011/0076994 A1* | 3/2011 | Kim | G06Q 10/109 455/414.2 |
| 2011/0228922 A1* | 9/2011 | Dhara | H04L 12/1818 379/202.01 |
| 2011/0246482 A1 | 10/2011 | Badenes et al. | |
| 2012/0244836 A1* | 9/2012 | Colbert | H04W 4/16 455/411 |
| 2012/0271676 A1* | 10/2012 | Aravamudan | G06Q 10/1093 705/7.18 |
| 2013/0007009 A1 | 1/2013 | Caldwell et al. | |
| 2013/0055108 A1* | 2/2013 | Bhattiprolu | H04L 12/1822 715/753 |
| 2013/0090973 A1* | 4/2013 | Hui | G06Q 10/06 705/7.24 |
| 2014/0058801 A1 | 2/2014 | Deodhar et al. | |
| 2014/0074999 A1 | 3/2014 | Khalsa et al. | |
| 2014/0115185 A1* | 4/2014 | Burtner | G06Q 10/10 709/232 |
| 2014/0237041 A1* | 8/2014 | Bhat | H04L 65/403 709/204 |
| 2014/0278377 A1 | 9/2014 | Peters et al. | |
| 2014/0310132 A1* | 10/2014 | Culver | G06F 17/5004 705/26.81 |
| 2014/0379405 A1* | 12/2014 | Herger | G06Q 10/1095 705/7.19 |
| 2015/0006221 A1* | 1/2015 | Mermelstein | G06Q 10/1093 705/7.19 |

(56) References Cited

U.S. PATENT DOCUMENTS

| | | | |
|---|---|---|---|
| 2015/0007056 A1* | 1/2015 | Cohen | H04L 65/403 |
| | | | 715/753 |
| 2015/0058425 A1* | 2/2015 | Nathan | H04L 65/403 |
| | | | 709/206 |
| 2015/0067026 A1 | 3/2015 | Christiansen et al. | |
| 2015/0134425 A1 | 5/2015 | Legris | |
| 2015/0271220 A1* | 9/2015 | Kleiner | H04L 65/403 |
| | | | 709/204 |
| 2015/0295768 A1* | 10/2015 | Herger | G06F 17/30864 |
| | | | 709/221 |
| 2016/0253632 A1* | 9/2016 | Won | G06F 3/048 |
| | | | 715/771 |
| 2016/0259775 A1* | 9/2016 | Gelfenbeyn | G06F 17/279 |
| 2016/0323223 A1 | 11/2016 | Davis et al. | |
| 2017/0124157 A1 | 5/2017 | Keohane et al. | |
| 2017/0264447 A1* | 9/2017 | Wallbaum | H04L 12/1822 |
| 2017/0357951 A1* | 12/2017 | Patel | G06Q 10/1095 |
| 2018/0020093 A1* | 1/2018 | Bentitou | H04M 3/4365 |
| 2018/0152488 A1* | 5/2018 | Dusad | H04L 65/403 |
| 2018/0181901 A1 | 6/2018 | Babcock et al. | |
| 2018/0204576 A1* | 7/2018 | Dhoot | G10L 17/005 |
| 2019/0340554 A1 | 11/2019 | Dotan-Cohen et al. | |

OTHER PUBLICATIONS

"International Search Report and Written Opinion Issued in PCT Application No. PCT/US19/029757", dated Aug. 9, 2019, 11 Pages.

"Non Final Office Action Issued in U.S. Appl. No. 15/973,375", dated Mar. 19, 2020, 44 Pages.

"Echoes: A Collaborative Tagging System for Conversations in the Enterprise", In White Paper of Avaya, Mar. 2010, pp. 1-12.

* cited by examiner

ASSOCIATING MEETINGS WITH PROJECTS USING CHARACTERISTIC KEYWORDS

CROSS-REFERENCE TO RELATED APPLICATIONS

This application claims the benefit of U.S. Provisional Application No. 62/452,910, titled "Associating Meetings with Projects using Characteristic Keywords," filed Jan. 31, 2017, which is hereby expressly incorporated by reference in its entirety.

BACKGROUND

Users of computer devices are often involved in many different projects. Any number of project-related entities may be utilized to facilitate a particular project including emails, files, contacts, and meetings. In order to track projects, users may manually group project-related emails, appointments, and meetings into folders within an email program. User-defined aspects of a meeting may be captured including participants, a meeting time, a meeting title, a meeting location, attachments, and text in the body of the meeting. Many times this information is inaccurate or incomplete in defining the actual meeting. For example, the participants attending can vary, or the meeting may start or end at a different time. Further, much information associated with the meeting will not be captured including user events (e.g., an instant message, opening a file, performing a web search), entities (e.g., files) interacted with or discussed, and topics discussed that were not anticipated. Additionally, many times users may hold unscheduled meetings, such as a conversation in a hallway, an instant message conversation, or another unplanned or unanticipated meeting. Further, a meeting planned for one project can include discussion of other projects. Thus, current computer project management technology is unable to reliably capture and track a significant portion of project-related information, such that it cannot be properly leveraged by computing systems.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the present disclosure relate to computer project management technologies for associating meetings with projects using. In some respects, projects are maintained in association with a user. For each project, a set of keywords that characterize the project are maintained. In some implementations, the set of keywords for one or more of the projects are utilized to identify a meeting associated with the user. For example, a conversation involving the user can be compared to the keywords to infer that the conversation corresponds to a project-related meeting.

In some implementations, a listening mode of a user device is enabled based on a meeting being identified. For example, a passive listening mode may be used to identify one or more of the keywords to identify the meeting. In response to the meeting being identified, an active listening mode may be enabled to perform speech-to-text transcription on the conversation. Further, contextual information associated with the conversation can be determined based on the text of the conversation.

In further aspects of the present disclosure, keywords can be extracted from conversational data of a conversation. The keywords can be mapped to a project, such as based on similarity between the extracted keywords and the set of keywords characterizing the project. Based on the mapping, a meeting corresponding to the conversation can be assigned to the project. The meeting and various meeting entities associated with the meeting, such as documents, files, and participants, may be tagged as project entities of the project based on the assignment. Further, searches can be performed on project entities using the project tags, providing computationally efficient access to this tagged data for various applications, including personalizing content to users.

BRIEF DESCRIPTION OF THE DRAWINGS

The present invention is described in detail below with reference to the attached drawing figures, wherein.

DETAILED DESCRIPTION

Figure 1:
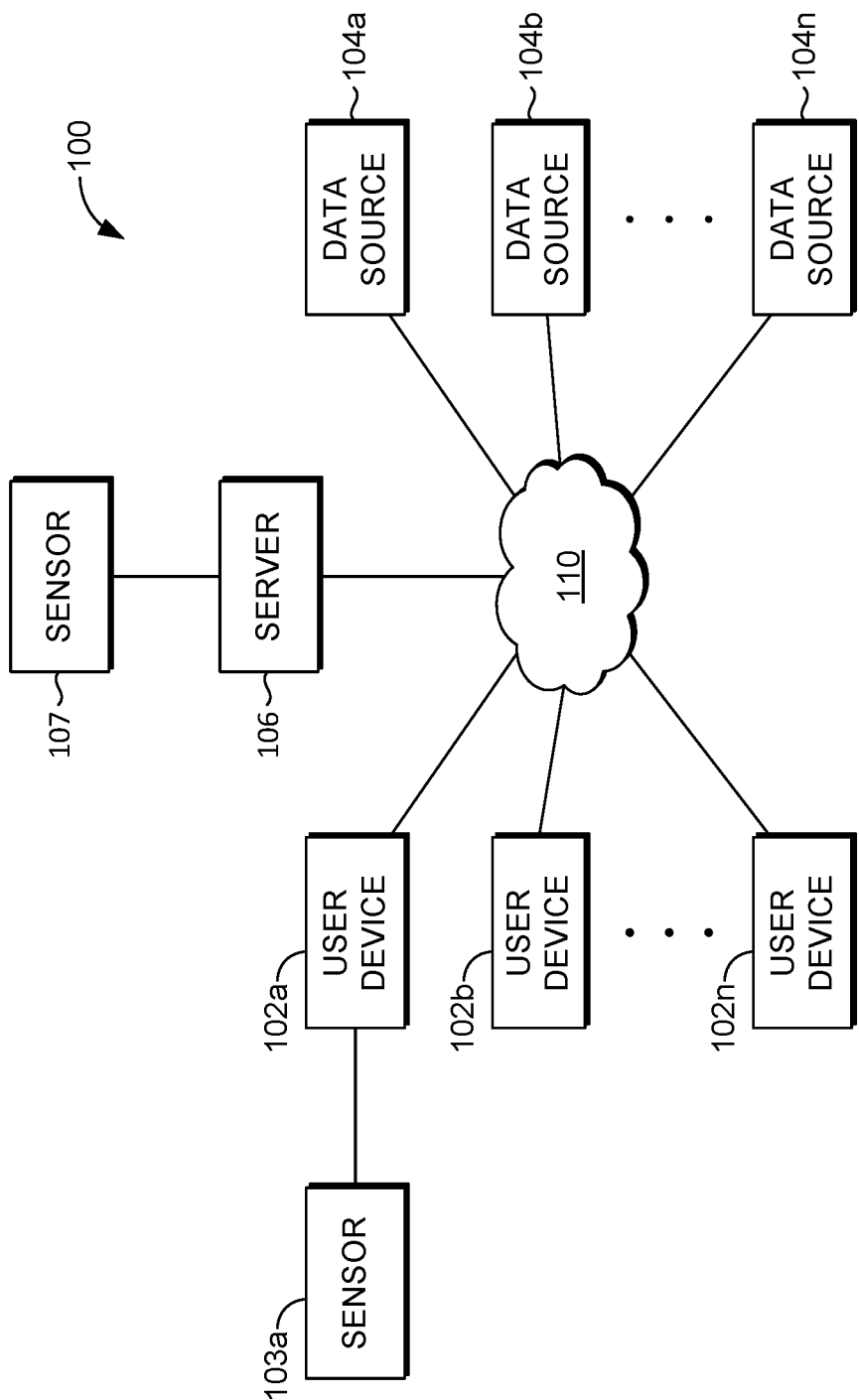
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Embodiments of the present disclosure relate to systems and methods for associating meetings with projects. In some respects, projects are maintained in association with a user. For each project, a set of keywords that characterize the project are maintained. In some implementations, the set of keywords for one or more of the projects are utilized to identify a meeting associated with the user. For example, a conversation involving the user can be compared to the keywords to infer that the conversation corresponds to a project-related meeting.

In some implementations, a listening mode of a user device is enabled based on a meeting being identified. For example, a passive listening mode may be used to identify one or more of the keywords to identify the meeting. In response to the meeting being identified, an active listening mode may be enabled to perform speech-to-text transcription on the conversation. Further, contextual information associated with the conversation can be determined based on the text of the conversation.

In further aspects of the present disclosure, keywords can be extracted from conversational data of a conversation. The keywords can be mapped to a project, such as based on similarity between the extracted keywords and the set of keywords characterizing the project. Based on the mapping, a meeting corresponding to the conversation can be assigned to the project. The meeting and various meeting entities associated with the meeting, such as documents, files, and participants, may be tagged as project entities of the project based on the assignment. Further, searches can be performed on project entities using the project tags, providing efficient access to this tagged data for various applications, including personalizing content to users.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that operating environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 maybe provided via multiple devices arranged in a distributed environment that collectively provide the functionality described herein. Additionally, other components not shown may also be included within the distributed environment.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

Data sources 104a and 104b through 104n may comprise data sources and/or data systems, which are configured to make data available to any of the various constituents of operating environment 100, or project management system 200 described in connection to FIG. 2. For instance, in one embodiment, one or more data sources 104a through 104n provide (or make available for accessing) data to user-data collection component 210 of FIG. 2. Data sources 104a and 104b through 104n may be discrete from user devices 102a and 102b through 102n and server 106 or may be incorporated and/or integrated into at least one of those components. In one embodiment, one or more of data sources 104a through 104n comprises one or more sensors, which may be integrated into or associated with one or more of the user device(s) 102a, 102b, or 102n or server 106. Examples of sensed project data made available by data sources 104a through 104n are described further in connection to user-data collection component 210 of FIG. 2.

Figure 2:
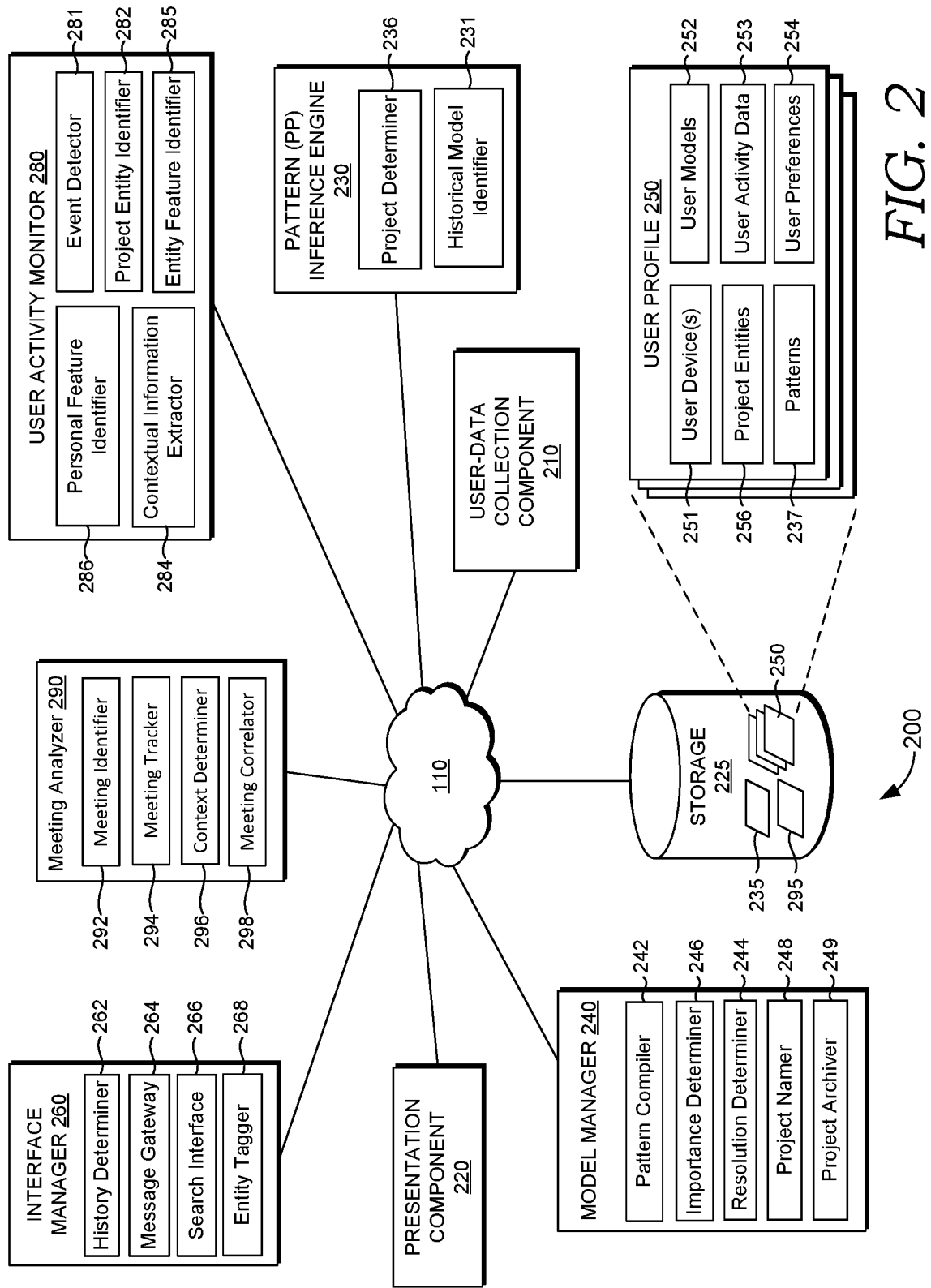
FIG. 2 is a block diagram illustrating an exemplary project management system in which some embodiments of the present invention may be employed.

Operating environment 100 can be utilized to implement one or more of the components of project management system 200, described in FIG. 2, including components for collecting user data, inferring project and meeting patterns, generating project and meeting models, generating event details or features, identifying meetings, associating meetings with projects and project entities, and/or presenting project and/or meeting related content to users.

Example of a Project Management System

Turning to FIG. 2, a block diagram is provided illustrating an exemplary project management system 200 in which some embodiments of the present disclosure may be employed. In particular, project management system 200 is one example of a system capable of determining projects from user data, identifying and extracting project meetings from user data, and associating the meetings with projects.

Project management system 200 includes network 110, which is described in connection to FIG. 1, and which communicatively couples components of project management system 200, including user-data collection component 210, presentation component 220, storage 225, pattern inference engine 230, model manager 240, user profile(s) 250, interface manager 260, user activity monitor 280, and meeting analyzer 290. The components of project management system 200 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of project management system 200 are associated with one or more personal assistant applications, services, or routines. In particular, such applications, services, or routines may operate on one or more user devices (such as user device 102*a*), servers (such as server 106), may be distributed across one or more user devices and servers, or be implemented in the cloud. Moreover, in some embodiments, these components of project management system 200 may be distributed across a network, including one or more servers (such as server 106) and client devices (such as user device 102*a*), in the cloud, or may reside on a user device such as user device 102*a*. Moreover, these components, functions performed by these components, or services carried out by these components may be implemented at appropriate abstraction layer(s), such as the operating system layer, application layer, hardware layer, etc., of the computing system(s).

Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

As noted above, it should be understood that project management system 200 shown in FIG. 2 is an example of one system in which embodiments of the present invention may be employed. Each component shown may include one or more computing devices similar to the operating environment 100 described with reference to FIG. 1. Project management system 200 should not be interpreted as having any dependency or requirement related to any single module/component or combination of modules/components illustrated therein. Each may comprise a single device or multiple devices cooperating in a distributed environment. For instance, project management system 200 may comprise multiple devices arranged in a distributed environment that collectively provide any of the various functionalities described herein. Additionally, other components not shown may also be included within the environment. It should therefore be understood that project management system 200 and/or its various components may be embodied by any suitable computer arrangement in accordance with various embodiments of the present disclosure.

Project management system 200 generally operates to manage projects with respect to project entities, particularly meetings. This can include identifying meetings from user activity data, determining project entities associated with meetings, tracking meetings, and correlating meetings with projects. In some respects, a meeting can be identified using project characteristics, formed by patterns extracted from project data, and determined from project models. These project characteristics can include project keywords, which when detected in a conversation indicate the conversation corresponds to a meeting that may be related to a project. In further respects, correlating a meeting with a project can be based on the similarity between project characteristics and meeting context, identified from user data in association with a particular meeting. For example, this can include determining how similar a set of project keywords associated with the project are to a set of meeting keywords associated with the meeting. Where the similarity is sufficiently high, the meeting may be assigned to the project, as well as any project entities associated with the meeting. The project characteristics and meeting context can thereby act as a bridge between meetings and projects.

As briefly mentioned above, each component of project management system 200, including user-data collection component 210, presentation component 220, pattern inference engine 230, model manager 240, user profile 250, interface manager 260, user activity monitor 280, and meeting analyzer 290, and their respective subcomponents, may reside on a computing device (or devices). For example, the components of project management system 200 may reside on the exemplary computing device 600 described below and shown in FIG. 6, or similar devices. Accordingly, each component of the project management system 200 may be implemented using one or more of a memory, a processor or processors, presentation components, input/output (110) ports and/or components, radio(s), and a power supply (e.g., as represented by reference numerals 612-624, respectively, in FIG. 6).

As an overview, in some embodiments, user-data collection component 210 facilitates the intake of data and makes the data available to project management system 200 in association with users (i.e., user data). User activity monitor 280 analyzes the user data to identify project entities, such as meetings, extract contextual features associated with user data, and extract personal features of users, such as characteristic features of users. As used herein, a "project entity" refers to a data object that system 200 associates with one or more projects. Examples include files, documents, emails, events, calendar events, meetings, contacts, users, word processing documents, meeting participants, image documents, presentation documents, applications, time slots, text such as words or phrases, topics, search queries or history, concepts, keywords, pictures, locations, venues, and more. Additionally, system 200 may associate a project entity with other project entities. For example, a meeting may be associated with any of various files, documents, events, and contacts that were included in a corresponding scheduled meeting, such as in a meeting request, and/or accessed, discussed, or referenced during or by the meeting.

Pattern inference engine 230 uses any combination of the various data provided by user activity monitor 280 to apply semantic understanding to project entities; identify previous projects for project entities, when available; identify project entities, such as meetings, from user data; and determine patterns for projects and/or meetings formed by user data. Model manager 240 uses the various pattern information from pattern inference engine 230 to create and/or update project and/or meeting models, determine the importance of individual projects and/or meetings, determine characteristics of projects and/or meetings (e.g., characteristic keywords), determine the resolution or granularity of projects, name projects, archive projects, identify meetings, correlate meetings with projects, track meetings, and determine meeting context (e.g., keywords).

Interface manager 260 facilitates the application of project models, including information derived therefrom, to computer applications, computer services, computer routines, and the like. This may be performed in conjunction with presentation component 220.

User-data collection component 210 is generally responsible for accessing or receiving (and in some cases also identifying) project data and meeting data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 280 and pattern inference engine 230.

The data may be received (or accessed), and optionally accumulated, reformatted, and/or combined, by user-data collection component 210 and stored in one or more data stores, such as storage 225, where it may be made available to other components of project management system 200. For example, the user data may be stored in or associated with user profile 250, as described herein. In various embodiments, any personally identifying data (i.e., user data that specifically identifies particular users) is either not uploaded from the one or more data sources with user data, is not permanently stored, and/or is not made available to user activity monitor 280 and pattern inference engine 230. Further it is contemplated that any features related to user-data collection and retention be optional and at the discretion of individual users.

User data, which may include project data and meeting data, may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information, such as user data from a data source 104a, and may be embodied as hardware, software, or both.

By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other user data associated with communication events; etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant") application or service), home-sensor data, data from a discrete or physical sensor, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, cellular network, or IP address data), and nearly any other source of data that may be sensed or determined as described herein.

In some embodiments, user data may be provided in at least one user-data stream or "user signal," which can be a feed or stream of user data from a data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses the data continuously, periodically, or as needed.

User data, particularly in the form of event data and/or location data can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data.

User activity monitor 280 is generally responsible for monitoring user data or information that may be used for identifying and/or managing projects and meetings on behalf of one or more users. User activity monitor 280 can employ meeting analyzer 290, event detector 281, contextual information extractor 284, project entity identifier 282, entity feature identifier 285, and personal feature identifier 286 to use this information to identify, determine, generate, collect, and/or maintain project entities, contextual features, and/or personal features that correspond to user activity associated with one or more users. Any combination of this data may be stored by user activity monitor 280 as user account(s)/activity data in association with users, such as user activity data 253. These includes features (sometimes referred to herein as "variables," such as project or meeting features or variables) or other information relating to projects and meetings that are identified and/or tracked by user activity monitor 280 with respect to one or more users.

As an overview, event detector 281 detects events, such as events that may be associated with projects or project entities, such as meetings, from user activity. Project entity identifier 282 identifies project entities, such as meetings, based on events detected by event detector 281 or otherwise based on identifying entities associated with users (i.e., using non-event based identification). Entity feature identifier 285 determines features of project entities, such as contextual features of particular project entities, and personal feature identifier 286 identifies personal features of users. Any of these various components can employ contextual information extracted by contextual information extractor 284 from user data, project or meeting entities, and/or detected events.

Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social media, or similar information sources). User activity monitor 280 may determine current or near-real-time user activity information and may also determine historical user activity information, in some embodiments, which may be determined based on gathering observations of user activity over time, accessing user logs of past activity (such as browsing history, for example), which may be stored in user activity data 253 in user profile 250. Further, in some embodiments, user activity monitor 280 may determine user activity (which may include historical activity) from other similar users (i.e., crowdsourcing), as described previously. For example, user data from other users collocated with the user during an event may be analyzed to determine entity features.

In some embodiments, information determined by user activity monitor 280 may be provided to pattern inference engine 230 including information regarding project entities (e.g., meetings), context features of those project entities, and historical features (historical observations, which may be provided from records in user profile 250).

As indicated above, in some embodiments, the user data and/or information about user activity determined from user activity monitor 280, including project-event related information, is stored in a user profile, such as user profile 250. This can include project entities 256 identified by project entity identifier 282 and/or user activity data 253 extracted by entity feature identifier 285, personal feature identifier 286, event detector 281, and/or contextual information extractor 284.

In an embodiment, user activity monitor 280 comprises one or more applications or services that analyze information detected via one or more user devices used by the user and/or cloud-based services associated with the user, to determine project-related activity information and related contextual information. Information about user devices associated with a user may be determined from the user data made available via user-data collection component 210, and may be provided to user activity monitor 280, pattern inference engine 230, or other components of project management system 200. More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

User activity monitor 280 may, at least partially, operate to detect user profile activity that is related to events associated with one or more users. Some embodiments of user activity monitor 280, or its subcomponents, may determine a device name or identification (device ID) for each device associated with a user profile. This information about the identified user devices associated with a user profile may be stored in a user profile associated with the user, such as in user devices 251 of user profile 250. In an embodiment, the user devices may be polled, interrogated, or otherwise analyzed to determine information about the devices. This information may be used for determining a label or identification of the device (e.g., a device ID) so that the user profile interaction with the device may be recognized from user profile data by user activity monitor 280. In some embodiments, user profiles may declare or register a device, such as by logging into an account via the device, installing an application on the device, connecting to an online service that interrogates the device, or otherwise providing information about the device to an application or service. In some embodiments, devices that sign into an account associated with the user profile, such as a Microsoft® account or Net Passport, email account, social network, or the like, are identified and determined to be associated with the user profile. Information in one or more of these accounts may provide project entities or user data that user activity monitor 280 may use to infer project entities, such as meetings.

In some embodiments, user activity monitor 280, one or more of its subcomponents, or other components of project management system 200, such as model manager 240 or pattern inference engine 230, may determine interpretive data from received user data. Interpretive data corresponds to data utilized by the components of project management system 200 or subcomponents of user activity monitor 280 to interpret user data. For example, interpretive data can be used to provide other context to raw user data, which can support determinations or inferences made by the components or subcomponents (e.g., to infer user activity, events, contextual or personal features, and the like). Moreover, it is contemplated that embodiments of user activity monitor 280, its subcomponents, and other components of project management system 200 may use user data and/or user data in combination with interpretive data for carrying out the objectives of the subcomponents described herein. Additionally, although several examples of how user activity monitor 280 and its subcomponents may identify user profile activity information are described herein, many variations of user profile activity identification and user profile activity monitoring are possible in various embodiments of the disclosure.

Contextual information extractor 284, in general, is responsible for determining contextual information related to the user profile activity (detected by user activity monitor 280), such as context, features or variables associated with project entities and/or events (e.g., detected keywords), related information, other user-related activity, and further responsible for associating the determined contextual information with the related events and/or project entities. In some embodiments, contextual information extractor 284 may associate the determined contextual information with a related event or entity and may also log the contextual information with the associated event or entity. Alternatively, the association or logging may be carried out by another service. For example, some embodiments of contextual information extractor 284 provide the determined contextual information to entity feature identifier 285, which determines entity features for entities, and personal feature identifier 286, which determines user personal features for the user profile.

Some embodiments of contextual information extractor 284 determine contextual information in relation to project entities (e.g., people or contacts present during a meeting and/or event or invited to a meeting and/or event, such as recipients of a group email, invite, or scheduled meeting, related to the meeting or event) or the location or venue wherein the meeting or event took place, is taking place, or will take place. By way of example and not limitation, this may include context features such as location data, which may be represented as a location stamp associated with an event; contextual information about the location, such as venue information (e.g., this is the user's office location, home location, conference room, library, school, restaurant, move theater, etc.), time, day, and/or date, which may be represented as a time stamp associated with the event and which, in some embodiments, may include yellow pages identifier (YPID) information; duration of the event, which may be different than a scheduled duration (i.e., the project was longer or shorter than scheduled); other user projects or activities preceding and/or following the event; other information about the event such as project entities associated with the event (e.g., venues, participants, contacts, people, objects, etc., which may be invited, in attendance, involved in planning, or otherwise involved); information detected by sensor(s) on user devices associated with the user that is concurrent or substantially concurrent to the event (e.g., location, motion information, online activity, user-device interactions, or physiological information detected on a fitness tracking user device); or any other information related to the event that is detectable that may be used for determining patterns of user-related activity associated with projects and meetings related to the user.

In embodiments using contextual information related to user devices, a user device may be identified by detecting and analyzing characteristics of the user device, such as device hardware, software such as operating system (OS), network-related characteristics, user accounts accessed via the device (e.g., online calendars), and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user profile. This information about the identified user devices associated with a user profile may be stored in a user profile associated with the user, such as in user devices 251 of user profile 250.

In an embodiment, the user devices may be polled, interrogated, or otherwise analyzed to determine contextual information about the devices. In some implementations, contextual information extractor 284 may receive user data from user-data collection component 210, parse the data, in some instances, and identify and extract context features or variables (which may also be carried out by entity feature identifier 285 and personal feature identifier 286). Context variables may be stored as a related set of contextual information associated with an event (e.g., a meeting event) and/or project entity, and may be stored in a user profile, such as in user activity data 253.

Event detector 281, in general, is responsible for determining (or identifying) that an event has occurred. As used herein, an event corresponds to one or more predefined user activities detectable via one or more computing devices. As will later be described in additional detail, embodiments of event detector 281 may be used by project entity identifier 282 to generate or identify project entities, by entity feature identifier 285 to extract contextual features of entities, and/or by personal feature identifier 286 to generate or identify personal features of the user.

Some embodiments of event detector 281 may monitor user data for project-related or meeting-related features or variables corresponding to user activity, such as communications received (e.g., project requests or calendar-related communications), indications of applications launched or accessed, files accessed, modified, copied, etc., websites navigated to, online content downloaded and rendered or played, user location or change of location (e.g., user is located in or has changed locations to a conference room), or similar user activities.

Additionally, some embodiments of event detector 281 use contextual information extractor 284 to extract from the user data information about events, which may include current activity, historical activity, and/or related information such as contextual information. Alternatively or in addition, in some embodiments, event detector 281 uses contextual information extractor 284 to determine and extract contextual information that is related to one or more project entities.

Examples of project-related activity information, such as meeting-related activity information, that can be extracted by contextual information extractor 284 and used by components of user activity monitor 280, such as event detector 281, referred to herein as project features, may include information describing app usage, online activity, searches, calls, usage duration, application data (e.g., project requests, emails, messages, posts, user profile status, notifications), or nearly any other data related to a user that is detectable via one or more user devices or computing devices, including user interactions with the user device, activity related to cloud services associated with the user (e.g., calendar or scheduling services), online account activity (e.g., email and social networks), and social network activity. As will be appreciated, project features can include meeting features where such information is associated with a meeting or an event that may be associated with a meeting (i.e., a meeting event).

Among other components of project management system 200, the extracted event information determined by event detector 281 may be provided to other subcomponents of user activity monitor 280 (e.g., entity feature identifier 285 and personal feature identifier 286), pattern inference engine 230, interface manager 260, or other components of project management system 200. Further, the extracted event information may be stored in a user profile associated with the user, such as in user activity data 253 of user profile 250. In some embodiments, event detector 281 or user activity monitor 280 (or its other subcomponents) performs conflation on the detected project-related information. For example, overlapping information may be merged, and duplicated or redundant information eliminated.

In some embodiments, the user data may be interpreted to determine that an event has occurred. For example, in some embodiments, event detector 281 employs event logic 295, which may include rules, conditions, associations, classification models, or other criteria to identify project-related activity, such as meeting-related activity. For example, in one embodiment, event logic 295 may include comparing event criteria with the user data in order to determine that an event has occurred.

In some embodiments, the identification and/or classifying of events can be based on feature-matching or determining similarity in features, which may be carried out using statistical classification processes Thus, event logic 295 may comprise pattern recognition classifier(s), fuzzy logic, neural network, finite state machine, support vector machine, logistic regression, clustering, or machine-learning techniques, similar statistical classification processes, or combinations of these to identify events from user data. Accordingly, event logic 295 can take many different forms depending on the mechanism used to identify an event, and may be stored in storage 225. For example, event logic 295 might include training data used to train a neural network that is used to evaluate user data to determine when an event has occurred. Moreover, event logic 295 may specify types of project features or user activity, such as specific user device interaction(s), that are associated with an event, accessing a schedule or calendar, accessing materials associated with a project entity (e.g., an agenda or presentation materials in a meeting), composing or responding to a project request communication, acknowledging a notification, navigating to a website, or launching an app. In some embodiments, a series or sequence of user-related activity may be mapped to an event, such that the event may be detected upon determining that the user data indicates the series or sequence of user-related activity has occurred or been carried out by the user.

In some embodiments, event detector 281 runs on or in association with each user device for a user. Event detector 281 may include functionality that polls or analyzes aspects of the user device, which may include online- or cloud-services accessible via the user device, to determine project-related features, such as sensor output, applications running (and in some instances the content of the applications), network communications, online/cloud activity related to the user, and/or other user actions detectable via the user device including sequences of actions.

Project entity identifier 282 is generally operable to identify any of the various project entities described herein with respect to one or more users. These identified project entities may be stored in association with one or more users, such as in project entities 256 of user profile 250. Project entity identifier 282 may identify project entities using any suitable means. In some cases, project entity identifier 282 identifies one or more project entities as an event, such as an event detected by event detector 281. As one example, the event could be a meeting event, an event capturing the user working on a project (e.g., using an application), and more. To this effect, an event may be an inferred project entity, where the system generates the project entity based on inferences derived from user data.

In some cases, project entity identifier 282 identifies an event as a project entity based on determining the event occurred, which may be based on a confidence score or other metric evaluating whether the event occurred. In other cases, project entities can be explicit project entities, which are explicit in user data. Examples of explicit project entities include files, emails, calendar items such as meetings, contact entries, and the like. One or more of these project entities may correspond to a data object having content explicitly defined or definable by one or more users (e.g., the message body of an email, start and end times of a meeting).

In some cases, project entity identifier 282 may identify one or more project entities based on one or more events detected by event detector 281. For example, project entity identifier 282 can identify project entities from contextual information or features associated with one or more events. For example, contextual information associated with a meeting event may comprise variables defining extractable project entities such as emails accessed during the meeting, location of the meeting or of the user during the meeting, photos taken during a meeting, users or contacts attending or invited to the meeting, files accessed or created during the meeting, search queries provided during the meeting such as file searches performed during the meeting or web searches performed during the meeting, and the like.

It is noted that project entity identifier 282 need not identify project entities in association with events. For example, project entity identifier 282 could identify and extract project entities (e.g., explicit project entities) directly from user data. This extraction could be defined by any number of extraction rules, which may define data object types (e.g., calendar items, emails, attachments, scheduled meetings), locations, associated applications, and the like for project entities. In some implementations, any combination of this information is captured by metadata or content of a data object, and project entity identifier 282 analyzes the metadata or content to determine whether to identify the data object as a project entity.

In various implementations, project entity identifier 282 identifies project entities in association with one or more email applications, such as based on being generated or accessed by an email application or in association with an email application, based on being referenced by or to an email application, and/or based on being used by or in association with an email application. For example, project entity identifier 282 can identify emails and/or meeting invites that are sent or received using the enterprise application, attachments to emails or meetings, as well as meetings themselves as project entities. Contextual information extractor 284 can extract meeting context for a meeting project entity from the various metadata of a meeting invite, such as attachments, titles, subject lines, locations, confirmed participants, invited participants, and the like (which may include project entities) associated with the meeting. Other project entities include contacts from the email application and/or from a global contacts list associated with users, which may include a contacts list tracked across user devices and/or integrated into operating system software.

Events can be project entities generated by project management system 200. As another example, project entity identifier 282 can generate a time slot as a project entity for projects of users. As used herein, a "time slot" can refer to a data object representing a period of time in which one or more activities can be performed by one or more users on one or more computing devices for one or more projects. In some cases, project entity identifier 282 is configured to generate time slots such that the set of time slots used by system 200 are non-overlapping.

In some implementations, one or more of the time slots are generated from calendar and/or meeting data associated with one or more users. For example, the time slots could be extracted from the email application described above, or a more global calendaring and scheduling service. A time slot could be defined by a start time and an end time for a meeting (e.g., extracted from scheduled meetings and/or meeting invites or requests), as one example. However, project entity identifier 282 could otherwise base generation of a time slot on a meeting, such as by defining a start time of a time slot as an arrival time of a user to a meeting and/or an end time of the time slot as a departure time of the user from the meeting.

It should be appreciated that the meeting may optionally correspond to an event and/or a calendar item associated with the user. Features of the project entity, such as start time and end time can be identified and/or assigned by entity feature identifier 285, which is further described below.

Thus, in some embodiments, project entity identifier 282 generates one or more of the time slots by detecting one or more events corresponding to user activity on one or more computing devices in association with a period of time. The period of time used for a time slot could correspond to the period of time over which the user activity occurred, as an example. As another example, the user activity could be inferred and the time slot could be determined based on analyzing patterns formed by previous time-stamped events corresponding to the user activity. In some cases, the period of time is determined based on entity features of one or more project entities, or otherwise extracted in association with a project entity. As an example, the period of time could be determined based on analyzing content and/or metadata of a data object corresponding to a project entity. This could include data object edit data (e.g., last date edited, accessed, date created). Another example includes email sending or receiving data (e.g., time sent, time received, and the like). In various implementations, the period of time could be determined from one or more time stamps associated with or assigned to events and/or project entities.

Other examples of project entities that can be generated by project management system 200 include text entities, topic entities, concept entities, and keyword entities. As used herein, a text entity can refer to a project entity that represents text, such as words, phrases, and the like. In some implementations, one or more of these project entities are generated by pattern inference engine 230, and therefore, these forms of entities are later described in further detail with respect to pattern inference engine 230.

Entity feature identifier 285 is generally responsible for identifying and optionally determining entity or project features (or variables) associated with the entities that may be used for identifying patterns corresponding to user projects. As indicated above, entity features may be determined from information about an event and/or from related contextual information associated with the project entity. In some embodiments, entity feature identifier 285 receives user-project or related information (e.g., contextual information) from user activity monitor 280 (or its subcomponents), and analyzes the received information to extract or otherwise determine a set of zero or more features associated with a project entity. The event features may be stored in user activity data 253 and/or made available to pattern inference engine 230 for determining project patterns based on the determined features. For example, common features for different project entities can be used to establish a project pattern.

In addition or instead, entity feature identifier 285 can identify and optionally extract one or more project features of a project entity from content of the data object representing or comprising the project entity and/or metadata of the data object. For a file, this could include file edit data (e.g., last date edited, accessed, date created). Another example includes email sending or receiving data (e.g., times, recipients, senders, and the like).

Entity feature identifier 285 is generally responsible for identifying and optionally determining entity or project features (or variables) associated with the entities that may be used for identifying patterns corresponding to user projects. As indicated above, entity features may be determined from information about an event and/or from related contextual information associated with the project entity. In some embodiments, entity feature identifier 285 receives user-project or related information (e.g., contextual information) from user activity monitor 280 (or its subcomponents), and analyzes the received information to extract or otherwise determine a set of zero or more features associated with a project entity. The event features may be stored in user activity data 253 and/or made available to pattern inference engine 230 for determining project patterns based on the determined features. For example, common features for different project entities can be used to establish a project pattern.

Personal feature identifier 286 is generally responsible for identifying and optionally determining user features (or variables) associated with the user that may be used for identifying patterns corresponding to user projects. Personal feature identifier 286 may identify user features similar to entity feature identifier 285 (e.g., from events and/or explicit information in user data). However, as opposed to entity features, which characterize or provide semantic information for a particular entity, user features may characterize, describe, or define a particular user.

Examples of personal features include information about user(s) using the device; information identifying a user, such as a login password, biometric data, which may be provided by a fitness tracker or biometric scanner; and/or characteristics of the user(s) who uses the device, which may be useful for distinguishing users on devices that are shared by more than one user. Other examples include demographic information, frequented venues or locations, search history, search queries, known interests (e.g., subjects, concepts, topics), organizational title, hierarchy within an organization, and information derived therefrom. For example, one or more of these personal features may be derived from patterns formed by pattern inference engine 230 and derived from project entities.

As an example, project topics can be extracted from project entities, as will be described in further detail below, and used to associate the user with one or more project topics. When analyzing a particular project entity, the system can leverage previous semantic knowledge of which project topics the user has been active in to determine a probability that the project entity corresponds to one or more of the project topics. This could include comparing the particular entity to the project topic(s) or project entities previously associated with project topics. This probability could be used as a feature in any of the various project entity grouping algorithms described below. It should be appreciated that this concept similarly applies to other properties or combination of properties of project entities other than project topics (e.g., similar search queries, locations, venues).

Examples of entity (e.g., meeting entity) and/or user or personal features include information extracted from requests or communications (e.g., project entities), such as time/date, scheduled duration, invitees, importance, responses (e.g., acceptance, tentative acceptance, declines), proposals or suggestions of alternative times/dates/locations/attendees/other entity features, entity subject(s), file attachments or links in entity-related communications, which may include content of the attachments or links, metadata associated with file attachments or links (e.g., author, version number, date, URL or website-related information); whether the entity is recurring (e.g., a meeting);

features from related entities or scheduled entities (where the entity is part of a series, such as recurring meetings or events); location-related features, such as location of an event, location of user device(s) during the event (which may indicate whether a user is present, not present, or attending remotely), venue-related information associated with the location, or other location-related information; time related features, such as time(s) of day(s), day of week or month of the event, or the duration of the event, or related duration information such as how long the user used an application associated with the event or how long a user traveled to attend the event; user device-related features (which in some embodiments may be used for identifying user attendance (physical or remote), participation, and/or involvement at events), such as device type (e.g., desktop, tablet, mobile phone, fitness tracker, heart rate monitor, etc.) hardware properties or profiles, OS or firmware properties, device IDs or model numbers, network-related information (e.g., mac address, network name, IP address, domain, work group, information about other devices detected on the local network, router information, proxy or VPN information, other network connection information), position/motion/orientation related information about the user device, power information such as battery level, user-access/touch information; usage related features, such as file(s) accessed, app usage (which may also include application data, in-app usage, concurrently running applications), network usage information, online activity (e.g., subject related searches, browsed websites, social networking activity related to the entity, communications sent or received including social media posts, user account(s) accessed or otherwise used (such as device account(s), OS level account(s), or online/cloud-services related account(s) activity, such as Microsoft® account or Net Passport, online storage account(s), email, calendar, or social networking accounts, etc.)), features that may be detected concurrent with the event or near the time or the event, or any other features that may be detected or sensed and used for determining a pattern of project-related activity for the user. In some embodiments, event logic 295 (described in connection to event detector 281) may be utilized to identify specific features from project-related information.

Continuing with system 200 of FIG. 2, pattern inference engine 230 is generally responsible for determining project or meeting patterns based on the various information determined from user activity monitor 280. For example, in some cases, pattern inference engine 230 uses contextual information generated by user activity monitor 280 as context-related entity features, such as for determining semantic information in events to determine a project and/or meeting pattern. Contextual information also may be determined from the user data of one or more users, in some embodiments, which may be provided by user-data collection component 210 in lieu of or in addition to user project information for the particular user. In an embodiment, the contextual information is stored with the corresponding entity in user activity data 253.

At a high level, pattern inference engine 230 may receive project entity data, at least some of which is provided using user activity monitor 280, or its subcomponents, user-data collection component 210 from client-side applications or services associated with user activity monitor 280, and/or user project or event history which may be stored in user profile 250. One or more inference algorithms may be applied to the entity information to determine project and/or meeting patterns from the project entities identified using project entity identifier 282. For example, patterns may be determined based on similar entity features between project entities or associated personal features, which may be referred to as "in-common features" of entity-related information.

The inferred event pattern information may be provided to model manager 240 and/or used to generate a project or meeting pattern based prediction regarding one or more projects inferred from the project entities. In some embodiments, a corresponding confidence is also determined for the patterns (or predictions based on the patterns), as described herein.

Pattern inference engine 230, or its subcomponents, may operate to analyze project entities, including entity features and optionally personal features, provided by user activity monitor 280. In some cases, personal features could correspond to, for example, historical projects previously identified and/or analyzed with respect to pattern inference engine 230 and/or explicitly acknowledged or otherwise specified by the user.

As shown in example system 200, pattern inference engine 230 comprises historical model identifier 231, and project determiner 236. Historical model identifier 231 is configured to identify a plurality of prior or current projects for a user, which may be considered for determining a project and/or meeting pattern. For example, personal feature identifier 286 may utilize historical project identifier 231 to identify project entities and/or projects from which to extract personal features.

Project determiner 236 is generally responsible for determining projects from user data based on patterns formed in the user data. This can include analyzing project entities with respect to one or more projects based on similarities in project entity information, such as entity features identified by entity feature identifier 285 and optionally personal features identified by personal feature identifier 286. For example, the patterns can be used to group or cluster project entities into projects, determine keywords and/or topics of projects, and update any combination of the forgoing for identified projects. In some cases, this includes project determiner 236 (or pattern inference engine 230) determining potential projects that the user may be associated with by extracting project topics from the project entity information and analyzing patterns formed by project entity information in order to associate project entities with one or more project topics. As new project entity information becomes available to the system (e.g., from newly generated and/or received user data), it can be used to reevaluate and/or update the determinations made by project determiner 236.

In some embodiments, project determiner 236 determines project or meeting patterns using pattern inferences logic 235. Pattern inferences logic 235 may include rules, associations, conditions, prediction and/or classification models, or pattern inference algorithms. The pattern inferences logic 235 can take many different forms depending on the particular project or meeting pattern or the mechanism used to identify a project or meeting pattern, or identify feature similarity among observed project entity data to determine the pattern. For example, some embodiments of pattern inferences logic 235 may employ machine-learning mechanisms to determine feature similarity, or other statistical measures to determine the event data belonging to a set of "example user activity" that supports the determined project or meeting pattern. In some embodiments, the project or meeting pattern(s) determined by project determiner 236 may be stored as model patterns 237 and/or provided to model manager 240, which may determine one or more inferred user model(s) 252 from the pattern(s).

Some embodiments of project determiner 236 determine a pattern for projects or meetings (e.g., project topics) where each project has corresponding historical values of tracked project or meeting features (variables) that form patterns, and where project determiner 236 may evaluate the distribution of the tracked variables for patterns. These project or meeting features and patterns may be utilized as personal features used to analyze new project entities with respect to projects and/or meetings and/or adjust previously determined associations between project entities and projects. These project features and patterns may also be utilized to personalize content to users based on the projects and/or meetings, or otherwise be consumed by the various components of project management system 200.

In some cases, the project features are based on project entities previously associated with the project by project determiner 236. In one instance, a tracked variable is associated with a time slot corresponding to an observed instance of the project. Optionally, the tracked variable could further be based on entity features of one or more entities within the time slot. It will be appreciated that, conceptually, many different types of historical values for tracked project features (variables) may be used. Further, it should be appreciated that the project determiner 236 may determine patterns for projects based on any number of features.

In some implementations, project determiner 236 comprises a multistage classifier in which a project entity preclassifier classifies project entities by project topic, a time slot grouper groups, or clusters, time slots by project entities associated with the time slots, and a project entity reclassifier reclassifies the project entities using the project topics by the grouped time slots.

The project entity preclassifier may extract project keywords from project entities and group project entities into project topics corresponding to the keywords. The keywords can be extracted, for example, from content of project entities, and/or metadata of project entities, which can include data object metadata and/or entity features. In some implementations, this includes extracting keywords from text in the content of the data objects represented by the project entities using text-based extraction techniques. For example, keywords can be extracted from emails (e.g., subject line, message body, attachments, and the like), documents accessed during or in association with meetings, meeting invites or other planning or scheduling messages, and the like. It is noted that any suitable keyword extraction techniques may be employed.

In some implementations, project determiner 236 identifies a set of differentiating keywords from the project entities. This can be accomplished, for example, based on determining the frequency of text, such as terms, in a project entity and/or across the project entities and basing the set of differentiating keywords on the frequency of the text. One suitable approach uses term frequency—inverse document frequency. In some cases, the differentiating keywords are extracted by applying a clustering algorithm to the text and project entities, and each differentiating keyword corresponds to a text cluster. Each text cluster can comprise documents or other project entities corresponding to the text cluster. Document classification algorithms may be utilized in various approaches (e.g., unsupervised document classification).

Project determiner 236 may identify and/or extract project topics or concepts from the keywords. Any suitable approach to converting keywords to topics may be employed. In some cases, the keywords (e.g., text clusters) are resolved or mapped to a project topic model. The project topic model can, in some implementations, be generated from the project entities, such as by using a topic model generator that may generate at least some topics from the differentiating keywords.

In some implementations, project determiner 236 resolves keywords to project topics using singular value decomposition (SVD) and non-negative matrix factorization (NMF). SVD may be used as one suitable approach to reducing the keywords down to the most relevant keywords. NMF may be used as another suitable approach to reducing the keywords down to the most relevant keywords in addition to or instead of SVD. These approaches may utilize the text clusters and also may employ entity features of the project entities associated with the text clusters. For example, a keyword may be mapped to a topic based on similarities defined by the project entities corresponding to the keyword.

In some cases, the topic models used and/or generated by project determiner 236 are hierarchical topic models. Using hierarchical topic models, projects and project entities are tracked and analyzed at various resolutions, or granularity. This can be used to present the projects to users at different resolutions, as well as optionally customizing the resolution to the user and/or allowing the user to select the resolution desired for presentation in various contexts. For example, a project topic could be "Client Relations," and under that project topic could be "customer acquisition" and "customer retention." Under each of those project topics could be project topics for particular clients.

In order to group the project entities into topics based on similarities between the project entities, project determiner 236 can detect the in-common features between project entities (e.g., from entity features and/or personal features). Project determiner 236 may determine and/or identify similarities for any type of the various entity features described above. Project determiner 236 can apply the in-common features as inputs to the machine-learning algorithms used for topic grouping and/or generation. For example, project determiner 236 may generate one or more matrices from the in-common features to use as inputs for project entity clustering algorithms (e.g., document clustering).

To this effect, project determiner 236 may identify in-common features corresponding to one or more users (e.g., the user) interacting with a project entity. In particular, project determiner 236 may identify each project entity for which it can identify or infer an explicit interaction based on detected user activity, such as an event. Examples include detecting user activity corresponding to a user opening a document, attaching a document to an email, drafting an email, working in an application, and the like. Project determiner 236 can generate one or more matrices of users and/or contacts per project entity from the identified features, which can be input to document clustering algorithms, such as NMF.

Project determiner 236 may also identify in-common features corresponding to a project entity explicitly referencing one or more project entities. In particular, project determiner 236 may identify each project entity for which it can identify an explicit reference to another project entity. Examples correspond to documents attached to an email, documents attached to a meeting, invitees or participants of the meeting, applications, locations, or venues mentioned in or linked from emails or meetings, and the like. Project determiner 236 can generate one or more matrices of references per project entity from the identified features, which can also be input to the document clustering algorithms, such as NMF.

Project determiner 236 may also identify in-common time-related features for the clustering algorithms. For example, each project entity may be associated with one or more times, time slots, and/or time stamps (examples have been described above). The project entities can be grouped into topics based on project determiner 236 determining one or more similarities between these time stamps. For example, the similarity between time-related features may be based on temporal proximity of the time-related features. This may be based on the notion that at least some project entities are more likely to belong to the same project when they are temporally similar. For instance, documents accessed concurrently are more likely to be related to the same project. As another example, emails sent and received within an hour are more likely to be related.

Project determiner 236 may also identify in-common place-related features for the clustering algorithms. For example, each project entity may be associated with one or more venues, locations, and/or GPS coordinates. The similarity between place-related features may be based on location proximity of the place-related features. This may be based on the notion that at least some project entities are more likely to belong to the same project when they are locationally similar. For instance, people may work on projects in particular locations. Thus, documents associated with the office are more likely to be related to the same project. Further, project entities associated with home might be less likely to be associated with project entities associated with the office. For example, those projects may be associated with personal projects.

Project determiner 236 can also group time slots, such as the time slot project entities discussed above. Project determiner 236 may also group the time slots based on the project entities associated with these time slots. For example, project entities related to a time slot may include project entities used to generate the time slot, project entities associated with time stamps within the time slots, events having time stamps within the time slot, project entities corresponding to detected user activity determined to have occurred within the time slot, and the like. Nearest neighbor techniques may be applied to the clustering using entity features of the project entities in association with particular time slots.

Project determiner 236 may also reclassify the project entities it initially classified, as discussed above, based on the clusters of time slots. In doing so, project entities may be moved to different topics based on their corresponding time slots. In further respects, reclassification can be based on one or more personal features of the user, such as those identified by personal feature identifier 286. These include personal features corresponding to the user's search history, the user's role in an organization, characteristics or semantics derived from previous project analysis, the user's position within an organizational hierarchy, known interests of the user, and the like.

As indicated above, in various implementations, the personal features utilized for reclassifying the project entities can be based on previous engagement of the user with other project entities. For example, in some cases, personal features could correspond to project features. These project features could be used to derive a probability that a project entity corresponds to the project. The probability may be based on determining project patterns for project entities that are similar to the project entity. For example, a project pattern for a project may be accessed based on the project pattern being formed by project entities that are the same type of project entity as the project entity (or otherwise identified as similar to the project entity). As an example, the pattern could be formed by meeting type project entities where the project entity corresponds to a meeting. By analyzing the user's historical patterns for a project with respect to a project entity, project determiner 236 can determine a probability, or confidence, that an unclassified project entity corresponds to the project.

To illustrate the forgoing, for a project topic for drafting a sales agreement, the user may not typically schedule or participate in meetings, resulting in a low probability of a meeting corresponding to the project topic. In contrast, for a project topic for drafting a licensing agreement, the user may frequently schedule or participate in meetings, resulting in a high probability of the meeting corresponding to the project topic. It is noted that this approach need not be project specific, and project patterns could be aggregated from different projects, such as by shared characteristics between the projects.

It is noted that for the entity classification and clustering described, project entities need not be limited to single project topics and/or time slots. In particular, associations between project entities and time slots or project topics can be weighted by strength and can vary over time. This may be captured using confidence scores for each project entity. Thus, a single project entity could be strongly associated with multiple project entities, such as may be identified by determining weightings for those project topics that exceed a threshold value, although one of those project topics may be identified as the prominent project topic based on the project entity having the highest weighting for that project topic. Theses project topics need not share a parent-child relationship in a hierarchical topic model. Further, in some cases, project determiner 236 reclassifies the project entities by adjusting weightings determined during its initial classification.

Using a project entity reclassifier, project entities may be shifted to different projects based on associated time slots. Further, project entities with weightings previously too low to associate with any particular project or project entities not previously analyzed may be associated with one or more projects. This approach may be suitable, for example, for non-textual files, such as audio, video, or picture files, or other project entity types that are sparse or lacking in textual content or metadata. While keyword extraction may be performed on these types of files, it can be inaccurate and processor intensive. By associating these non-textual project entities with time slots grouped by projects, they can be accurately associated with projects. For example, in some embodiments, the keyword extraction is not performed on these types of project entities.

Thus, in some embodiments, project determiner 236 provides project patterns and associated confidence scores regarding the strength of the project patterns. These project patterns may reflect the likelihood that a user will follow the pattern for future events. More specifically, in some embodiments, a corresponding confidence weight or confidence score may be determined regarding a determined project pattern for a user. The confidence score may be based on the strength of the pattern, which may be determined based on the number of observations (i.e., the number of project entities) used to determine a project pattern, how frequently the user activity is consistent with the project pattern, the age or freshness of the activity observations, the number of similar features, types of features, and/or degree of similarity of the features in common with the activity observations that make up the pattern, or similar measurements.

In some instances, the confidence score may be considered when providing a determined project pattern to model manager 240. For example, in some embodiments, a minimum confidence score, or weighting, may be needed before using the project pattern to infer a project or meeting exists based on the pattern. In one embodiment, a threshold of 0.6 (or just over fifty percent) is utilized such that only project patterns having a 0.6 (or greater) likelihood of predicting user actions with regards to a project and/or meeting may be provided. Nevertheless, where confidence scores and thresholds are used, determined patterns of project entities with confidence scores less than the threshold may still be monitored and updated based on additional project entity observations, since the additional observations may increase the confidence for a particular pattern.

In some approaches, bootstrapping is employed. For example, initial project patterns may not be sufficiently strong due to insufficient data; however, project determiner 236 may make a preliminary analysis of project patterns and update those determinations as additional data becomes available to system 200. This additional data may be sufficient to support inferences that projects exist and/or which project entities belong to those projects.

Bootstrapping may be applied, for example, to the hierarchical classification of project topics. Initially, data may be sufficient to infer a project topic applies to the user, but may be insufficient for sub project topics until additional data is received and/or analyzed by system 200 to increase confidence scores for those topics. Additionally, new keywords may introduce new potential project topics into the model. In another approach, several project topics are identified to apply to the user. Similarities are determined between the project topics in order to construct a model. Thus, it should be appreciated that top-down or bottom-up approaches can be employed.

As mentioned previously, model manager 240 uses the various project pattern information from project pattern inference engine 230 to create and/or update project models, determine the importance of individual projects, determine the resolution or granularity of projects, name projects, and archive projects. As shown in system 200, model manager 240 includes pattern compiler 242, importance determiner 246, resolution determiner 244, project namer 248, and project archiver 249.

Pattern compiler 242 may operate to compile one or more project patterns for a user determined by project determiner 236 or pattern inference engine 230. In particular, according to a compilation of one or more project patterns, a project model may be determined and used to infer project-related aspects for future projects and/or project entities. In some embodiments, pattern compiler 242 provides a project model for projects at the resolution determined by resolution determiner 244 and/or based on the importance of the project determined by importance determiner 246. In some embodiments, pattern compiler 242 also may gather semantic information, features, categories, and any other project-related data/information available via project management system 200 for use in the project model.

Importance determiner 246 is operable to determine the importance of projects. For example, importance determiner 246 may assign an importance score to each project topic. The importance score can quantify the importance of the project topic to the user relative to other project topics. As another example, importance determiner 246 could assign the importance score to groups of project topics. This may be suitable where a hierarchical mode is employed. For example, an importance score may be generated for the project topic at a resolution selected by and/or inferred for the user (e.g., an importance score for a parent topic may be used for child topics).

In some implementations, importance scores are based on time slots and/or time stamps associated with the projects, and/or the number of project entities within the project. More important projects may be inferred for projects having more project entities. Further, more important projects may be inferred for projects associated with more time slots. As another example, more important projects may be inferred projects that have project entities associated with more recent time stamps and/or time slots. It should therefore be appreciated that importance scores for projects can change over time as new project entities are received and/or processed by pattern inference engine 230 and/or based on elapsing time.

Resolution determiner 244 is operable to determine project resolution for users. Project resolution can refer to a level for a project in the hierarchical project model. By personalizing the resolution to users, projects can be analyzed at the appropriate level of detail for that user. Thus, for example, a manger may have a lower resolution on projects than employees working under the manager, in order to capture a broad spectrum. In contrast, the resolution may be higher and more specific for those employees in order to focus the data presented to those users on their tasks.

This can save processing power, bandwidth, and other computing resources. For example, fewer details may be required by the system for tracking project entities and presenting content to a user at a lower resolution. As another example, for content generated using a higher resolution of a project, the analysis of project entities and patterns can be narrowed from lower resolutions to reduce processing demands (e.g., there is less data associated with a child project topic than its parent so less processing is required).

In some cases, the resolution for a project may be at a default resolution: as additional project entities are analyzed, the system may automatically adjust the resolution. For example, resolution may be changed based on importance scores for project topics. In one approach, resolution determiner 244 analyzes the importance score for one or more outliers or project topics above a standard deviation or otherwise greater than other projects. Resolution determiner 244 may select the resolution for various projects based on these outliers. For example, if a project topic has an importance score sufficiently greater than each of its child project topics, resolution determiner 244 may set the resolution to that project topic. In some cases, where a resolution is set to a project topic, model manager 240 and pattern compiler 242 process the project at that project topic level, such that project models for the lower level project topics are not individually processed and maintained, thereby reducing computing resources. It should be noted that importance scores may still be updated and generated for each project topic, and may be used to adjust the resolution over time. Further, in some cases, the user may set the resolution or selectively generate views of the project at other project levels.

Project namer 248 may optionally be employed and is generally responsible for naming or labeling projects for users. The names can be presented to the user in association with their corresponding projects to refer to those projects. In other approaches, names may not be required. For example, different projects may be distinguished using a color coding system or other system to visually distinguish projects. In some cases, the names are automatically generated based on the project topics and/or importance scores. In addition or instead, a project name may be based on a resolution of the project for the user (e.g., the project topic at the selected resolution and/or its subtopics).

Project namer 248 can generate project names that are personalized to users. In addition or instead, project namer 248 can use a system-wide naming scheme to maintain consistency across users. For example, the same project may have the same name for different users, which could be independent of project resolution. It is contemplated that users could additionally have personalized names for projects, which optionally may be set or modified by individual users.

Project archiver 249 is configured to archive projects over time. For example, old inferred projects may be archived based on their importance scores. A project may be archived based on its importance score falling below a threshold value over time. This could occur, for example, based on the system identifying few project entities for the project over a period of time. It is contemplated that archiving a project may be based on user approval and/or direction to archive. Data for an archived project may be maintained, such as project patterns, inferences, project tags, and the like. However, new project entities may be not compared to an archived project, thereby reducing computing resources utilized to identify projects and/or assign project entities to projects.

Some embodiments of the present disclosure further include using project data elements from other users (i.e., crowdsourcing data) for determining project patterns, project models, and/or relevant supplemental content to build project models. Accordingly, in an embodiment, project models may incorporate compiled prior project patterns, crowdsourced event data, detected existing projects, and current user profile activity, among other inferred or gathered data, to construct project models. The generated (or updated) project models may be stored in user profile 250 associated with the user, such as in user models 252.

Identifying Meetings and Correlating Meetings with Projects

As indicated above, aspects of the present disclosure provide for identifying meetings from user data, and correlating, or associating, identified meetings with projects, such as those determined using project determiner 236. Meeting analyzer 290 may be used to provide this functionality to project management system 200. As shown, meeting analyzer 290 includes meeting identifier 292, meeting tracker 294, context determiner 296, and meeting correlator 298. In some implementations, meeting analyzer 290 and its various components may be implemented using user activity monitor 280, pattern inference engine 230, and model manager 240.

As an overview, meeting identifier 292 is configured to identify meetings from user data. This can include determining whether a meeting has occurred, will occur, or is occurring by analyzing the user data. Meeting tracker 294 is configured to track meetings over time, such as documents interacted with, conversational topics, and the like. Meeting correlator 298 is configured to associate meetings identified by meeting identifier 292 with projects, examples of which include projects determined by project determiner 236. Context determiner 296 is configured to determine and/or provide contextual information from user data to any of the various constituents of meeting analyzer 290 to support the various determinations and/or inferences made by those elements. For example, context determiner 296 may extract contextual information meeting identifier 292 may utilize to identify a meeting, meeting tracker 294 may utilize to track a meeting, and meeting correlator 298 may utilize to associate meetings with projects. In some cases, context determiner 296 is implemented using contextual information extractor 284.

As mentioned above, meeting identifier 292 is configured to identify meetings from user data. In some implementations, meeting identifier 292 identifies meetings using user activity monitor 280. Identifying a meeting can include identifying a project entity, such as a meeting entity, using any of the various approaches described above. For example, project entity identifier 282 may be utilized to identify the meeting. As described above, in some cases, a meeting entity can represent a scheduled meeting, which may be identified based on being associated with the user. For example, the meeting could be identified based on being scheduled in a calendar of the user (e.g., an email calendar). In other cases, meeting identifier 292 may identify a meeting by inferring the meeting from user data. For example, meeting identifier 292 may infer a meeting using user activity monitor 280, as described above.

In various implementations, meeting identifier 292 can identify a meeting based on an analysis of at least one conversation between at least two users, which is captured in user data. For example, meeting identifier 292 can determine whether a conversation is part of or indicates a meeting. This can be used, for example, to identify unscheduled meetings. A conversation between users generally includes at least one message directed by a user (at least one user) to another user (at least one other user), and at least another message responsive to the at least one message that is directed by the other user to the user.

A conversation that meeting identifier 292 may analyze can be captured by any suitable digital medium and in some cases is facilitated by one or more digital services, such as applications. For example, one or more digital services may be used to manage and track the exchange of conversational messages (i.e., the messages that comprise the conversation) between the users. Examples include instant messaging programs, email programs, chat programs, video chat programs, Voice over Internet protocol (VoIP) programs, text messaging programs, conferencing programs, and more. Examples of the digital mediums include instant messages, emails, streaming or live video, a video file, streaming or live audio, an audio file, VoIP and/or phone transmissions, text messages, recordings, records, or logs of any combination of the forgoing, and more.

It should be appreciated that a conversation detectable by meeting identifier 292 (e.g., using user activity monitor 280) may occur cross-service and/or cross digital medium. For example, the same conversation could include a user texting another user and the other user emailing the user a response. In other cases, meeting identifier 292 could use transitions to new services to delineate new conversations and/or meetings. It is further noted that meeting identifier 292 can detect a conversation in real time, as it is occurring (e.g., from streaming data), and/or after it has completed (e.g., from log data). For example, a meeting may be detected from an audio feed of a conversation captured by one or more user devices (e.g., a mobile phone).

In some implementations, meeting identifier 292 identifies a meeting based on one or more existing projects and/or previous meetings. For example, meeting identifier 292 can identify a meeting by determining similarities between the one or more projects (e.g., identified by project determiner 236) and/or previous meetings and conversational data of a conversation. As used herein "conversational data" of a conversation refers to at least some of the messages comprising the conversation and/or at least some of the contextual information associated with the conversation. Where the similarity to conversational data is sufficiently high, meeting identifier 292 may infer a meeting.

To determine the similarities, meeting identifier 292 may optionally employ one or more project and/or meeting models, such as those managed by model manager 240. For example, as indicated above, model manager 240 can determine characteristics of projects and/or meetings associated with the user from a project and/or meeting model. As described above, this can be accomplished using pattern inference engine 230. The inferred event pattern information may be provided by pattern inference engine 230 to model manager 240 and/or used to generate a project or meeting pattern based prediction regarding one or more projects inferred from the project entities. In some embodiments, a corresponding confidence score or weighting is also determined for the patterns (or predictions based on the patterns).

A prediction can represent a characteristic of one or more projects and/or meetings. Any number of characteristics may be analyzed for similarity with respect to conversational data of a conversation to infer a meeting. As indicated above, in some implementations, one or more meeting models may be maintained and tracked separate from project models. A meeting model may capture patterns formed by previous meetings of at least one user (e.g., identified by meeting identifier 292), such as the user associated with user profile 250. These patterns can be formed by entity features of the meetings (i.e., meeting entities), such as those determined by entity feature identifier 285. Examples of inferred characteristics of meetings include typical meeting times, typical participants, typical meeting topics, typical meeting locations or venues, typical devices used during meetings, typical entities interacted with during the meeting, typical applications interacted with during the meeting, typical digital services used for the meeting, and more.

In some implementations, project models are not employed and a meeting model can be independent from any project model. In other cases, a meeting model may be derived, at least partially, from one or more project models. In these cases, a meeting model may capture patterns formed by meetings for one or more particular projects. For example, a meeting model may be determined from an aggregate of meeting entities from each project identified by project determiner 236 for a user. A characteristic derived from such a model can correspond to a typical feature for a meeting associated with the user. Thus, when similar to conversational data of a conversation, the characteristic can indicate a meeting is likely to exist for the particular user (e.g., a meeting associated with at least one project model).

As another example, a meeting model may be determined from an aggregate of meeting entities from a subset of the projects (e.g., project topics) identified by project determiner 236 for a user. A characteristic derived from such a model can correspond to a typical feature for a meeting related to the subset of projects (i.e., one or more projects) associated with the user. Thus, when similar to conversational data of a conversation, the characteristic can indicate a meeting related to the particular subset of projects is likely to exist for the particular user.

In some implementations, the characteristics of projects and/or meetings that meeting identifier 292 uses to identify meetings include characteristic keywords used in the projects and/or meetings. The keywords can include individual keywords and/or keyword phrases extracted from project entities associated with the project and/or meetings. For example, the characteristic keywords can include at least some of the differentiating keywords described above. For example, meeting identifier 292 may identify a meeting for a particular project using differentiating keywords for that project. As another example, the differentiating keywords could correspond to multiple projects (e.g., by aggregating keywords cross-project) in order to identify a meeting of any project. As another approach, the characteristics of each project may be evaluated separately against user data.

As mentioned above, the keywords may be weighted, such as by their frequency of detection in project entities. The higher the weighting the more representative the keyword (or keyword phrase) may be of a project. In aggregating keywords, these weightings may be averaged or otherwise combined for a set of keywords meeting identifier 292 uses to identify meetings. Further, in some cases, only keywords having a threshold weighting may be used to identifying meetings. In addition or instead, meeting identifier 292 could select a predetermined number of top-weighted keywords to use to identify meetings for a project.

It should be appreciated that characteristic keywords could similarly be extracted and determined without project models. For example, the keywords could be determined based on extracting text from project entities associated with meetings (e.g., scheduled or otherwise known meetings). Further, it should be appreciated that the keywords used for identification can change as additional project entities are analyzed and additional meetings are identified by meeting identifier 292 using the keywords.

Using the aforementioned characteristic keywords, meeting identifier 292 can identify a meeting based on a comparison between the characteristic keywords and one or more keywords context determiner 296 extracts from the conversational data of a conversation. Where the conversational keywords are sufficiently similar to the characteristic keywords, meeting identifier 292 may identify a meeting. For example, it should be appreciated that meeting identifier 292 may base the similarity on the semantic similarity between keywords (or keyword phrases), or may use any other suitable approach, such as keyword matching. Further, in some cases, the determined similarity level may be updated over time as new keywords are extracted from the conversational data, such as during analysis of a real-time conversation.

It should be appreciated that context determiner 296 may provide for extracting the conversational keywords from a conversation and/or project entities associated with the conversation (e.g., by user activity monitor 280). These project entities may include files accessed during a conversation, a location of the conversation, applications opened during the conversation, photos or video taken during the conversation, or any event or entity detectable by user activity monitor 280. It should also be appreciated that this conversational context may be compared by meeting identifier 292 to corresponding characteristic context of project meetings (e.g., extracted from patterns formed by project meetings, as described above) in order identify a meeting associated with a project. For example, the similarity to typically interacted with locations, accessed documents, files, and applications may be used to identify a meeting (e.g., for a particular project or aggregated projects).

In some implementations, meeting identifier 292 uses the similarity between conversational data and characteristics of project and/or meeting models in conjunction with a passive listening mode (or more generally a low power mode) on one or more user devices. For example, the conversational keywords could be acquired in the passive listening mode, which could be executing on a user's cell phone, laptop, desktop, and/or other user device. In some cases, this passive listening mode is associated with a digital agent, such as a personal assistant application running on the user device(s).

In various implementations, the digital agent may be part of user activity monitor 280, and provide at least some of the conversation data to meeting identifier 292. The digital agent can be implemented using any combination of client-side and/or server-side software. Where passive listening is employed by the digital agent, in some cases, the client-side software performs passive listening by processing audio from one or more users. In some cases, the client-side software further determines whether to enter into an active listening mode based on the processing of the audio, such as by identifying one or more "wake up" keywords (e.g., a keyword phrase) from the audio. In accordance with implementations of the present disclosure, meeting identifier 292 can utilize at least some of the aforementioned characteristic keywords as "wake up" keywords.

Conventionally, "wake up" keywords utilized in passive listening are static. However, as described above, the characteristic keywords can be dynamic and further personalized to one or more users. Furthermore, conventionally, a digital agent determines whether a user spoke the exact keywords used to enter active listening mode. However, meeting identifier 292 may, as described above, use semantic analysis of the keywords to identify a meeting and determine to enter an active listening mode. Additionally, conventionally spoken words must exactly match the "wake up" keywords. However, meeting identifier 292 may identify a meeting and determine to enter active listening mode based on detecting a subset of many characteristic keywords it evaluates against the audio, which can correspond to any number of projects.

Meeting identifier 292 may, in some cases, employ the aforementioned similarity level or score to determine whether to enter active listening mode. For example, where the similarity score exceeds a threshold value, meeting identifier 292 may determine a meeting exists and enter active listening mode. In other cases, the similarity score may be determined as a separate measure from meeting identifier 292 evaluating conversational keywords, or may not be used.

In the active listening mode (or more generally higher power mode), the client-side software may optionally provide audio received during the active listening mode to server-side software for processing. Further, the server-side software may provide one or more instructions or results of the processing to the client-side software in response to the processing. In some cases, the active listening mode enables meeting tracker 294. The passive listening mode may more generally be a lower power mode than the active listening mode. In particular, the active listening mode may comprise additional processing load and/or resource utilization on the user device than the passive listening mode.

It is noted that, in some cases, an active listening mode may be entered into based on an evaluation of meeting data without first being in a passive listening mode. For example, for a scheduled or known meeting, the active listening mode may be enabled based on the start time of the meeting. In addition or instead, the passive listening mode may similarly be enabled based on the start time of the meeting. Also, in some cases, predictions extracted from project and/or meeting models may be used to determine whether to enable a listening mode. For example, where the user is at home, the listening mode may not be enabled. However, based on determining that the user is at work, the listening mode may be enabled. This could generally include enabling audio capture by a microphone on the user device. Other factors for automatically enabling the microphone include characteristic meeting times for the user.

Using approaches described herein, meeting identifier 292 can identify a meeting even where it is unscheduled in a user calendar. However, when available, a scheduled meeting could be used to trigger an active listening mode or as a factor in determining whether to enter or maintain an active listening mode. For example, meeting identifier 292 may determine a meeting based on a proximity of a conversation to a scheduled or known meeting. As an example, often after a meeting has ended, users may continue discussion of a project or may discuss other projections. Further, some users may continue discussion over other mediums than what was used for the scheduled meeting, such as a conversation in the hallway, a phone call, a follow-up email, or an instant message. Meeting identifier 292 can identify these informal meetings, thereby capturing information that would otherwise be lost and unassociated with projects. Thus, it should be appreciated that conversational keywords and/or other conversational data may serve as bridges to projects.

It is noted that any number of similarity scores may be employed, and meeting identifier 292 may determine and evaluate project characteristics separately for each project. This can include meeting identifier 292 determining a separate similarity score for each set of differentiating or characterizing keywords and/or other characteristics of each project. Meeting identifier 292 may identify a meeting where the similarity is sufficiently high for at least one of the projects (i.e., a meeting only need be identified in association with a single project).

Meeting tracker 294 is configured to track an identified meeting over time, and may be enabled based on meeting identifier 292 identifying a meeting. Meeting tracker 294 may, for example, update the similarity scores of projects as the meeting progresses and/or determine new similarity scores between conversational data of a conversation comprising the meeting and project characteristics.

In some cases, meeting tracker 294 utilizes context determiner 296 for speech recognition of the meeting. In some implementations, the speech recognition uses a predetermined speech vocabulary of one or more users associated with the meeting. The predetermined speech vocabulary can aid in understanding specific conversation topics and other information spoken during the meeting. For example, context determiner 296 may prepare in advance of the meeting relevant speech vocabulary of the user. The speech vocabulary can be used to identify keywords or other information spoken by the user and/or other users in the meeting. For each user, context determiner 296 may take audio samples of the user's speech and derive the speech vocabulary for the user to use in speech identification. The speech vocabulary can be implemented as feature vectors representing the user's audible speech when speaking specific words, such as the characteristic keywords of projects. Based on meeting identifier 292 identifying the meeting, context determiner 296 may retrieve the pre-prepared vectors for use in the speech-to-text translation of the conversation.

In some implementations, context determiner 296 may determine the speech vocabulary based on conversational data or other meeting data. For example, context determiner 296 could select the vocabulary from meeting context including a meeting topic, meeting activities, and other meeting metadata. The speech vocabulary can include speech (phoneme) vectors with relevant dates, relevant keywords, relevant participants' names, and other information extracted in association with the meeting. Speech vectors may be provided for each user associated with the meeting, as available. Using the speech vectors can significantly improve speech recognition of the meeting, as well as reduce the processing required for speech-to-text translation. For example, the contextually relevant speech vectors represent words that are more likely to be used in the context of the identified meeting. Therefore, they can be effectively leveraged for word disambiguation and recognition for the meeting.

In some implementations, meeting tracker 294 maintains one or more groups of meeting entities associated with the meeting or conversation as contextual information of the meeting. This can include documents, files, events, and/or any type of information described herein as project entities. Meeting tracker 294 may optionally assign or associate time stamps to these entities corresponding to references by a participant in the meeting (e.g., by speech) to the entities, or user interactions with the entities detected by user activity monitor 280.

In some implementations, meeting tracker 294 determines a set of meeting keywords from the meeting data. Meeting tracker 294 may optionally use the conversational keywords, when available. The set of meeting keywords can be extracted from conversational data of the meeting, such as the conversation and/or contextual information associated with the conversation. For example, the keywords can be extracted from the documents, attachments, applications, and the like accessed during or otherwise associated with the meeting. The set of keywords can be determined similar to the differentiating keywords of projects described above, and therefore is not described in detail. Further, a set of the meeting keywords can be updated as new words are added to the conversation and/or conversational data and meeting tracker 294 analyses that data.

Meeting tracker 294 can determine one or more meeting topics from the meeting keywords (e.g., keyword phrases) and/or other conversational data. In some cases, this can be accomplished similar to determining project topics, described above. For example, the project topic model used to determine project topics may be used to determine meeting topics. In various implementations, meeting tracker 294 may attempt to map the meeting keywords to project topics in the project topic model and/or the existing project topics identified by project determiner 236. As the meeting keywords are updated, meeting tracker 294 may also update the determined meeting topics. In some cases, meeting tracker 294 may determine the meeting corresponds to more than one topic.

In some cases, meeting tracker 294 can identify shifts in project topics being discussed or otherwise relevant to the meeting topic. Optionally, meeting tracker 294 may associate one or more times (e.g., a time range) with each meeting topic, corresponding to a time(s) where meeting tracker 294 determines the meeting topic is relevant to the meeting. Meeting tracker 294 could accomplish meeting topic and/or other meeting characteristic progression, for example, using state-based tracking and associating the temporal information with the states. Meeting tracker 294 may optionally determine the times for project topics based on the time stamps of the entities in the groups of meeting entities identified with respect to the meeting.

It will be appreciated that other conversational data can be utilized as factors in assigning meetings to topics in addition to or instead of the keywords. For example, each project topic may have a predetermined probability of corresponding to a meeting, which can be used as one of the factors. In some cases, the probability could correspond to the importance score of the project. In addition or instead, the probability could be based on determining a frequency that the project topic corresponds to past meetings. For example, the probability for a given project could correspond to a number of past meetings (project entities) assigned to the project.

It should be appreciated that in various implementations, the project topics that the keywords are mapped to are personal to a user. Therefore, the different project topics may be inferred from the same meeting for different users. Further, due to the adaptive nature of project topics, different project topics may be identified for the same user at different points in time.

Meeting tracker 294 may optionally tag the meeting with one or more time stamps. For example, meeting tracker 294 may optionally determine a time slot for the meeting. The start time may correspond to a time at which meeting identifier 292 identified the meeting, and/or a time corresponding to the conversation or conversational context used to identify the meeting. Meeting tracker 294 may also determine an end time of the meeting, such as based on an analysis of the conversation. Each time slot may be associated with a project entity representing a meeting.

As mentioned above, meeting correlator 298 is configured to associate meetings identified by meeting identifier 292 with projects. For example, meeting correlator 298 may assign each meeting to the project topic(s) identified by meeting tracker 294 as a project entity of the project (e.g., by tagging the project entity with the project). Further, each meeting entity associated with the meeting may also be tagged with or assigned to the project. In some implementations, meeting correlator 298 is implemented using entity tagger 268, which is later described in additional detail.

Interface manager 260 is generally responsible for facilitating the consumption of data generated from project and meeting patterns and/or models by consumer applications or services. In some embodiments, interface manager 260 operates in conjunction with presentation component 220 to provide a user interface for providing and/or interacting with data of an identified project or meeting. In doing so, content can be personalized to the user based on the projects and meetings associated with the user. Presentation component 220 generally operates to render various user interfaces or otherwise provide information generated by project management system 200 and the components thereof in a format that can be displayed on a user device. By way of example, presentation component 220 may render a project or meeting management service interface for receiving project and meeting settings, which may be stored in user preferences 254. Examples of the settings have been described above and include project resolutions, project names or nicknames, and the like. Presentation component 220 may further render a project or meeting informational service for presenting project and meeting details provided by interface manager 260.

Embodiments of interface manager 260, and/or its subcomponents, may run on a single computing device, across multiple devices, or in the cloud. For example, in one embodiment where interface manager 260 operates in conjunction with features provided by Microsoft® Exchange, interface manager 260 may reside, at least in part, on an Exchange server, which may be embodied as server 106 in FIG. 1. Further, presentation component 220 may at least partially be embodied as user device 102*a*.

Interface manager 260 includes history determiner 262, message gateway 264, search interface 266, and entity tagger 268. Entity tagger 268 is operable to tag project entities with corresponding projects. Tagging a project entity can include storing a project's tag in the project entity in association with the project. This can include a project identifier, a project name (as described above), an importance indicator (e.g., corresponding to the project's importance score), a confidence score for each project (e.g., a level of confidence the project entity corresponds to the project), and/or a project resolution level or project hierarchy indicator. In some cases, entity tagger 268 tags projects with a subset of identified projects, such as those having the highest importance scores in conjunction with the importance scores exceeding a threshold value.

Presentation component 220 can utilize the project tags to present the projects and meetings to users. For example, a project or meeting may be displayed in association with information from its project tag, such as its project name. Further, presentation component 220 may present the project or meeting based on its project resolution level and importance level or score.

History determiner 262 is operable to provide project summaries, analysis, and efficiency suggestions, which can be presented by presentation component 220. To do so, pattern inference engine 230 can analyze project features corresponding to project time slots and corresponding project entities. History determiner 262 may further surface suggested applications based on project history, such as frequently used applications detected from user activity.

History determiner 262 can identify the times the user worked on or will work on a project and expose it to the user. This could include generating a summary of projects and time over a user-specified time period (e.g., weekly, monthly, daily). History determiner 262 can employ search interface 266 for project-based queries, which is described below in additional detail. History determiner 262 could also process time-related queries against projects, such as determining when a user first worked on a project or surfacing documents based on the project's lifecycle, allowing the user to understand the project lifecycle.

It is noted that history determiner 262 can be forward looking. For example, project entities may be incorporated into the project history that have not yet occurred or elapsed. Thus, a user may request or otherwise be provided with a summary for a project(s) of an upcoming week, day, or other time period.

In some implementations, history determiner 262 summarizes the meetings provided by meeting analyzer 290. The summary can include, for example, a timing corresponding to when meeting identifier 292 identified the meeting, such as a timing of an awakening event (e.g., enabling active listening mode). The summary may also include at least some of the keywords and/or other conversational data corresponding to the awakening event (e.g., the conversational data having a threshold similarity with the project characteristics). In addition or instead, the summary could include at least some of the meeting keywords that were mapped to the project topic(s). The summary can also include one or more lists of entities and one or more indications of how those entities were associated with the meeting. For example, lists of documents accessed during the meeting, lists of participants detected from an analysis of the conversation, etc. Another example includes one or more summarizations of the conversation of the meeting, optionally grouped by project topic and/or keywords.

Message gateway 264 is operable to act as a gateway to messages and notifications being presented to the user. Message gateway 264 can, in some implementations, monitor and analyze incoming messages and notifications and determine whether to permit those communications to be presented on a user device. To do so, message gateway 264 may determine whether a communication corresponds to one or more particular projects. For example, message gateway 264 can determine whether to block or permit one or more communications from being presented based on which projects they correspond to or to which they fail to correspond. To do so, message gateway 264 may analyze a message with respect to known project entities identified for a project, including whether the message corresponds to a contact, includes one or more project keywords or terms, and the like.

In some cases, message gateway 264 blocks or permits the one or more communications (e.g., emails, phone calls, text messages, push notifications) based on determining that the user is engaged in the project. For example, identified project relevant communications can be presented and the non-project relevant communications that are identified may be blocked from presentation. Message gateway 264 may determine the user is engaged in the project via various approaches. In some cases, message gateway 264 may determine the user is in a meeting corresponding to the project based on the meeting being identified by meeting identifier 292. As another example, message gateway 264 could make such a determination by comparing user activity (e.g., current activity or previous) with respect to project features. This can include determining a probability the user will be or is engaged in the project. For example, detected interactions with applications, contacts, and/or time periods (e.g., day of week, time of day, week of month or year, month of years, etc.) frequently associated with a project can indicate the user is engaged in the project. In addition or instead, the user may explicitly label a meeting or time slot with a project tag that message gateway 264 uses to identify project engagement.

Search interface 266 is operable to facilitate processing of searches with respect to projects and meetings. For example, search interface 266 can process search queries against project tags and/or meeting data (e.g., meeting keywords and/or meeting summaries). This can allow, for example, a user via presentation component 220 to search for each file related to one or more particular projects or meetings, which may optionally specify a particular project entity type for search results. As another example, a user can search for project entities related to a meeting based on the time slot and/or conversational data of the meeting. For example, the user could provide the time-based natural language query "show me the document I discussed in the meeting." The search results can be presented on a user device associated with the user. In some cases, search interface 266 ranks project entities against search queries. For example, search interface 266 can rank project entities by their confidence scores and/or importance scores. Optionally, search interface 266 processes search queries that specify one or more time periods or ranges to search for project entities. In implementations where time slots are clustered to projects and meetings, these queries can efficiently be resolved with low processing requirements.

In some cases, search interface 266 may retrieve search results based on an analysis of conversational data of a meeting (e.g., the conversation). For example, during a meeting, search interface 266 could automatically generate one or more search queries from the conversational data. The search results (e.g., a single result) of the query or queries may automatically be presented on a user device during the meeting. Thus, a user may refer to a document, and search interface 266 may automatically determine and present the document to the user. When a user later refers to another document or file (e.g., project entity), it may similarly be identified (e.g., based on the currently inferred project topic) and presented.

Search interface 266 can also operate to personalize other types of searches to users. For example, web search, document searches, contact searches, and the like can be personalized based on project data such as meetings. For example, search entities can be compared to project features and/or entities (e.g., meetings) and the ranking of the search entities can be based on their similarities to the project data. In further respects, these searches could in some cases be performed by a personal assistant running on a user device, such as to interpret a user command or query, or otherwise return results to the user input based on processing the input against project data. As an example, suppose a user provides a voice command, "Call John." Assume the user has many contacts named John. Search interface 266 can determine the user is or will be engaged in a project (e.g., meeting), as described above, and further resolve the command to "John Smith," based on determining that contact corresponds to the project (e.g., that contact may be a project entity associated with the project). Thus, the user need not specify additional details about the subject of the query in the command. This can, for example, reduce the bandwidth and storage size required to transmit the voice commands to the server, as well as avoid follow-up user prompts and/or user commands.

In some embodiments, information from project or meeting models may be displayed or made accessible via interface manager 260 and presentation component 220. A user may be able to access aspects of and view his or her project or meeting models. This may provide an opportunity for the user to see patterns and trends that may be reflected in their models. Further, in some instances, the models of other user profiles and/or aggregated models (which may remove identifying information, in some instances) may also be generated for display. Moreover, some embodiments of the invention may construct a complementary or shadow calendar for one or more users, based on the associations between projects and time slots, which may be displayed to one or more users.

In further respects, history determiner 262 may identify a new or recent participant to join a project. For example, the participant may be detected in a meeting (e.g., conversation). Based on history determiner 262 determining the participant does not correspond to a characteristic project participant, interface manager 260 may provide access to one or more documents or files, summaries, or other information associated with the project. This could include automatically sharing the data with the user and/or providing one or more links to the information.

Figure 3:
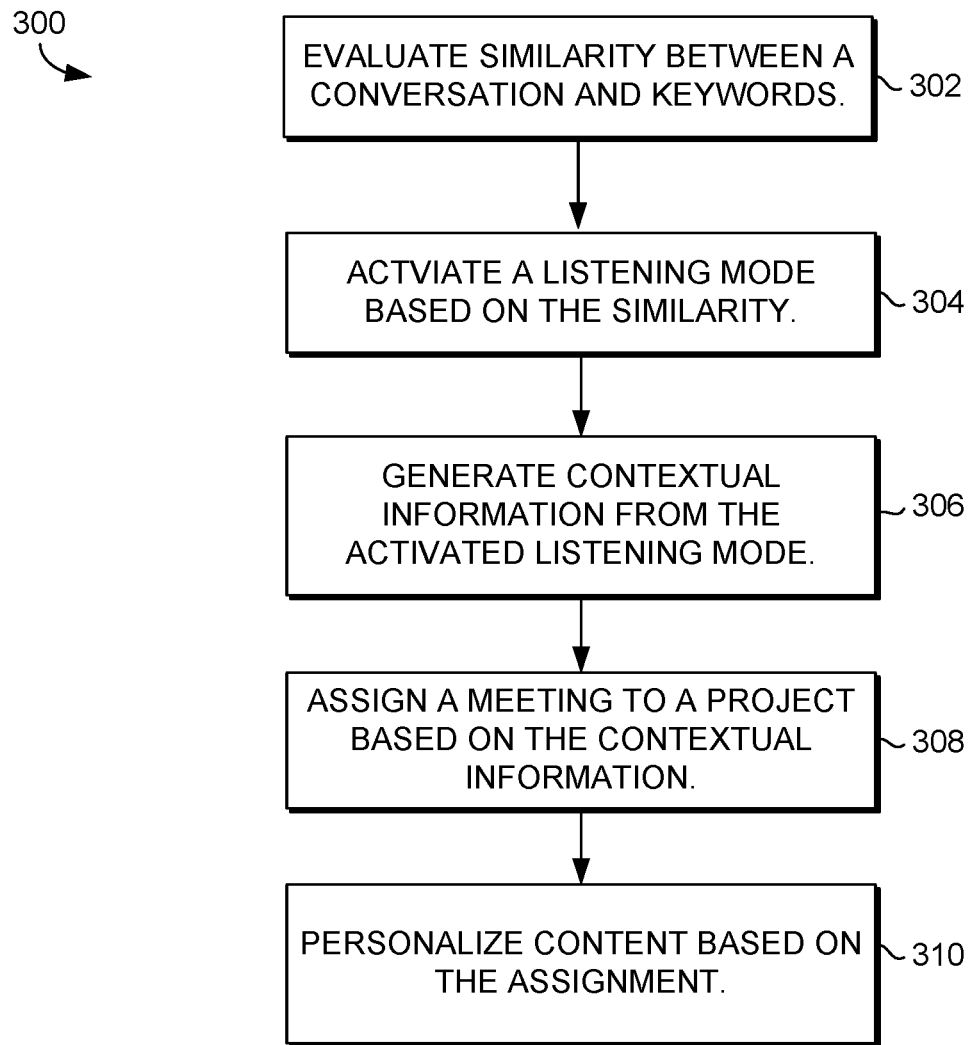
FIG. 3 is a flow diagram that illustrates a method for associating meetings with projects in accordance with embodiments of the present disclosure.

Turning now to FIG. 3, a flow diagram is provided that illustrates method 300 for associating meetings with projects in accordance with implementations of the present disclosure. As shown at block 302, method 300 includes evaluating similarity between a conversation and keywords. For example, meeting analyzer 290 can evaluate a similarity between a conversation between two or more users and a set of keywords characterizing at least one project corresponding to user models 252 associated with a user of the two or more users. User activity monitor 280 may capture the conversation captured from sensor data.

At block 304, method 300 includes activating a listening mode based on the similarity. For example, based on the similarity, meeting analyzer 290 can activate a listening mode on a user device associated with the user.

At block 306, method 300 includes generating contextual information from the activated listening mode. For example, meeting analyzer 290 can generate contextual information associated with the conversation from portions of the sensor data provided by the activated listening mode.

At block 308, method 300 includes assigning a meeting to a project based on the contextual information. For example, meeting analyzer 290 can assign a meeting corresponding to the conversation to a project (e.g., from user models 252) associated with the user based on the contextual information.

At block 310, method 300 includes personalizing content based on the assignment. For example, interface manager 260 can personalize content to the user based on the assignment of the meeting to the project. The personalized content can be presented on a user device using presentation component 220.

As used herein, personalizing content to a user refers to generating content or providing content based on information corresponds to user data associated with the user. Examples of the information include any of the various information stored in user profile 250 associated with the user, such as information corresponding to search results of a search on project entities using project tags. For example, content may be generated and/or provided to the user based on the user being associated with a project and/or a project entity. Content may be generated or provided based on information derived from any of the various information stored in user profile 250, such as inferred information.

Examples of personalized content are described throughout and could comprise, for example, any of the various content provided by presentation component 220 (e.g., information populating a user interface) which in addition to what has been described above, can include values for fields in a template, such as a content card, an email, a push notification, a text message, or other message or visualization, which may be provided to the user. This could include suggestions, recommendations, and the like that are generated based on the user data.

Figure 4:
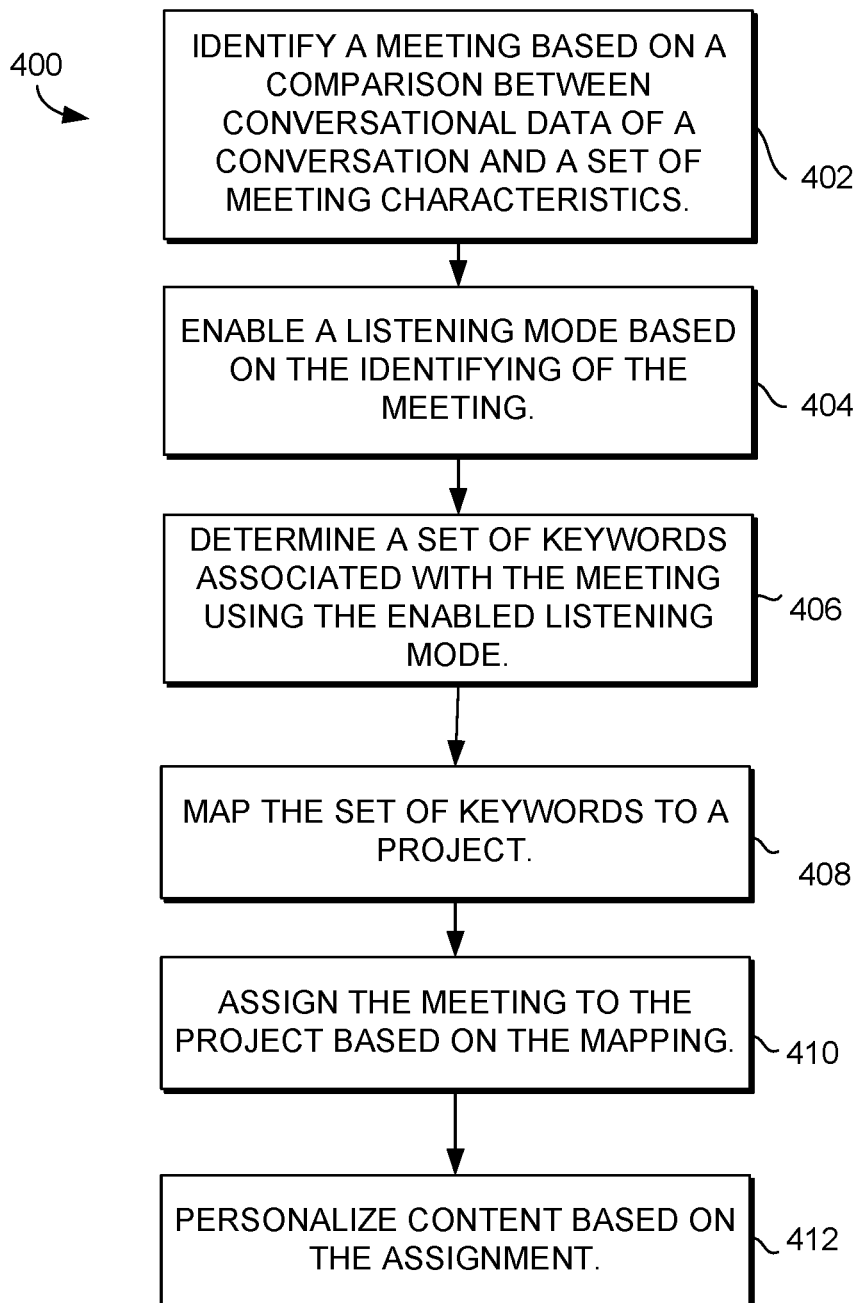
FIG. 4 is a flow diagram that illustrates a method for associating meetings with projects in accordance with embodiments of the present disclosure.

With reference to FIG. 4, a flow diagram is provided that illustrates method 400 for associating meetings with projects in accordance with implementations of the present disclosure. At block 402, method 400 includes identifying a meeting based on a comparison between conversational data of a conversation and a set of meeting characteristics. For example, meeting analyzer 290 can identify a meeting based on a comparison between conversational data of a conversation between two or more users and a set of meeting characteristics determined from at least one pattern formed by a plurality of meetings associated with a user of the two or more users, the conversation captured by sensor data from at least one user device.

At block 404, method 400 includes enabling a listening mode based on the identifying of the meeting. For example, meeting analyzer 290 can, based on the identifying of the meeting, enable a listening mode on a user device associated with the user.

At block 406, method 400 includes determining a set of keywords associated with the meeting using the enabled listening mode. For example, meeting analyzer 290 can determine a set of keywords associated with the meeting from a speech-to-text translation provided by the enabled listening mode.

At block 408, method 400 includes mapping the set of keywords to a project. For example, meeting analyzer 290 can map the set of keywords to a project associated with the user.

At block 410, method 400 includes assigning the meeting to the project based on the mapping. For example, meeting analyzer 290 can assign the meeting to the project based on the mapping.

At block 412, method 400 includes personalizing content based on the assignment. For example, interface manager 260 can personalize content to the user based on the assignment of the meeting to the project. The personalized content can be presented on a user device using presentation component 220.

Figure 5:
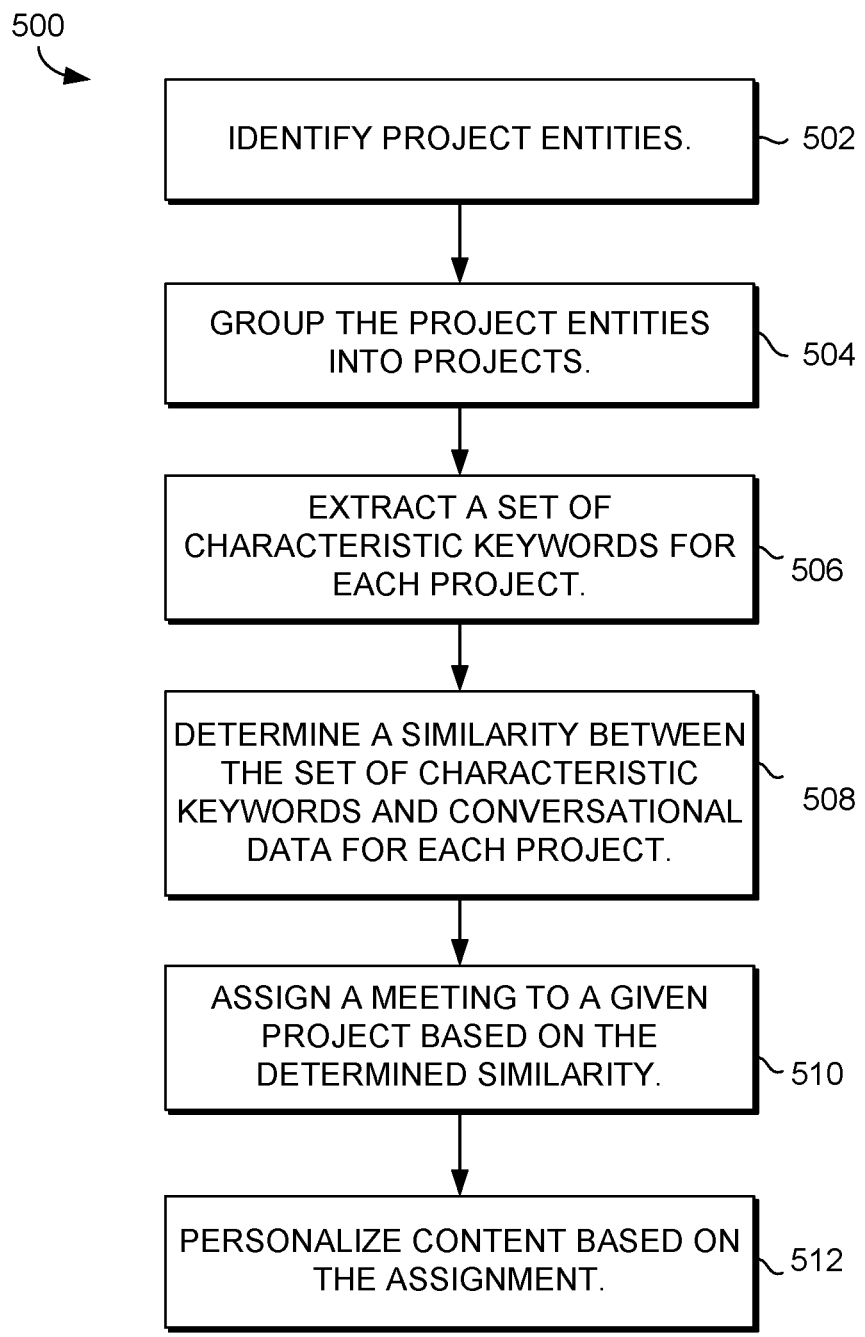
FIG. 5 is a flow diagram that illustrates a method for associating meetings with projects in accordance with embodiments of the present disclosure.

With reference to FIG. 5, a flow diagram is provided that illustrates method 500 for associating meetings with projects in accordance with implementations of the present disclosure. At block 502, method 500 includes identifying project entities. For example, project entity identifier 282 can identify project entities based on user activity data corresponding to sensor data associated with a user.

At block 504, method 500 includes grouping the project entities into projects. For example, project determiner 236 can extract topics from the project entities and associate the project entities with the project topics.

At block 506, method 500 includes extracting a set of characteristic keywords for each project. For example, project determiner 236 can extract a respective set of characteristic keywords from the project entities for each project of the projects.

At block 508, method 500 includes determining a similarity between the set of characteristic keywords and conversational data for each project. For example, meeting analyzer 290 can determining a similarity between the respective set of characteristic keywords for each of the projects to conversational data of a conversation of a meeting between users.

At block 510, method 500 includes assigning a meeting to a given project based on the determined similarity. For example, meeting analyzer 290 can assign the meeting to a given project of the projects as a project entity based on the determined similarity for the given project.

At block 512, method 500 includes personalizing content based on the assignment. For example, interface manager 260 can personalize content to the user based on the assignment of the meeting to the project. The personalized content can be presented on a user device using presentation component 220 such as by transmitting the personalized content to the user device and presenting the content in association with the user, as one example.

It is understood that various features, sub-combinations, and modifications of the embodiments described herein are of utility and may be employed in other embodiments without reference to other features or sub-combinations. Moreover, the order and sequences of steps shown in the example methods 300, 400, and 500 are not meant to limit the scope of the present invention, and in fact, the steps may occur in a variety of different sequences within embodiments hereof. Such variations and combinations thereof are also contemplated to be within the scope of embodiments of the invention.

Figure 6:
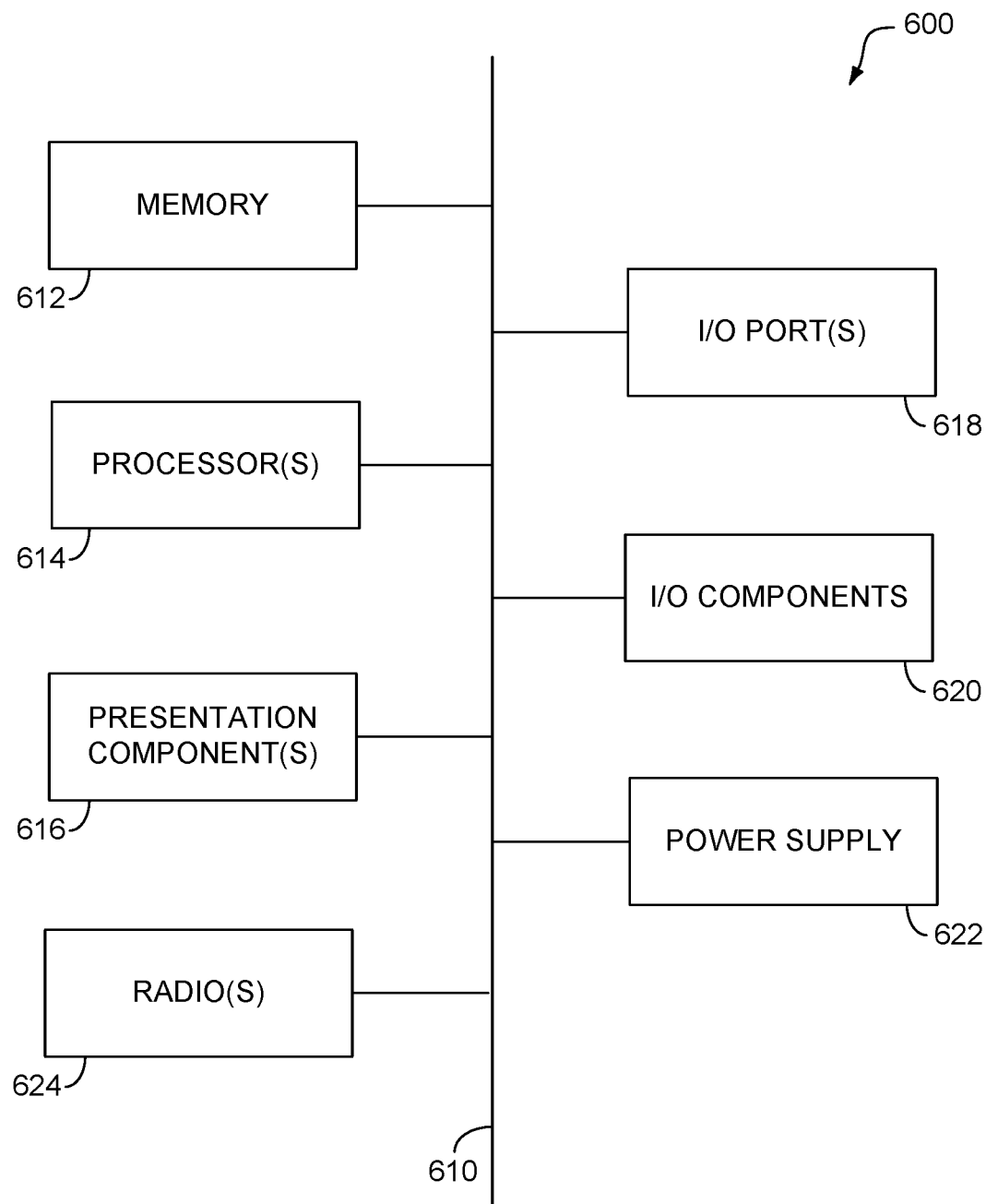
FIG. 6 is a block diagram that illustrates an exemplary computing device in accordance with embodiments of the present disclosure.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the present invention. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. A computer-implemented system comprising:
    one or more sensors configured to provide sensor data from at least one user device; one or more processors; and
    one or more computer storage media storing computer-useable instructions that, when executed by the one or more processors, implement a method comprising:
        evaluating a similarity between a conversation between two or more users and a set of keywords characterizing at least one project associated with a user of the two or more users, the conversation captured by the sensor data;
        based on the similarity, activating a listening mode on a user device associated with the user;
        generating contextual information associated with the conversation from portions of the sensor data provided by the activated listening mode;
        assigning a meeting corresponding to the conversation to a project associated with the user based on the contextual information; and
        personalizing content to the user based on the assignment of the meeting to the project.

2. The computer-implemented system of claim 1, wherein the set of keywords characterizing the at least one project is extracted from a plurality of project entities assigned to the at least one project.

3. The computer-implemented system of claim 1, wherein the evaluating the similarity analyzes a portion of the conversation provided by a passive listening mode of the user device for the similarity.

4. The computer-implemented system of claim 1, wherein the activating of the listening mode switches the user device from a lower power listening mode to a higher power listening mode.

5. The computer-implemented system of claim 1, wherein the generating of the contextual information comprises:
    identifying a plurality of meeting entities based on user interactions with the meeting entities during the conversation; and
    extracting at least some of the contextual information from the plurality of meeting entities.

6. The computer-implemented system of claim 1, further comprising:
    identifying a plurality of meeting entities based on user interactions with the meeting entities during the conversation; and assigning at least some of the identified plurality of meeting entities to the project based on the contextual information.

7. The computer-implemented system of claim 1, wherein the contextual information comprises at least one keyword extracted from conversational data of the conversation, and the assigning of the meeting comprises mapping the at least one keyword to a project topic representing the project.

8. The computer-implemented system of claim 1, wherein the set of keywords characterizing the at least one project comprises at least one keyword phrase.

9. The computer-implemented system of claim 1, further comprising, for each project of a plurality of projects associated with the user, evaluating similarities between the conversation and a respective set of keywords characterizing the project, wherein the activating the listening mode is based on the evaluating of the similarities.

10. The computer-implemented system of claim 1, wherein the at least one project does not comprise the project.

11. The computer-implemented system of claim 1, wherein the conversation is provided as audio from at least one microphone associated with the user device.

12. One or more computer storage devices storing computer-useable instructions that, when used by one or more computing devices, cause the one or more computing devices to perform a method comprising:
identifying a meeting based on a comparison between conversational data of a conversation between two or more users and a set of meeting characteristics determined from at least one pattern formed by a plurality of meetings associated with a user of the two or more users, the conversation captured by sensor data from at least one user device;
based on the identifying of the meeting, enabling a listening mode on a user device associated with the user;
determining a set of keywords associated with the meeting from a speech-to-text translation provided by the enabled listening mode;
mapping the set of keywords to a project associated with the user;
assigning the meeting to the project based on the mapping; and
personalizing content to the user based on the assigning of the meeting to the project.

13. The one or more computer storage devices of claim 12, wherein the comparison is between the conversational data and a set of keywords extracted from the plurality of meetings.

14. The one or more computer storage devices of claim 12, wherein the identifying of the meeting is based on evaluating a similarity between the conversational data and a set of keywords characterizing the plurality of meetings.

15. The one or more computer storage devices of claim 13, wherein the plurality of meetings are project entities of a project assigned to the user.

16. A computer-implemented method comprising:
identifying project entities based on user activity data from sensor data from at least one user device;
grouping the project entities into projects based on an analysis of the project entities;
extracting a respective set of characteristic keywords from the project entities for each project of the projects;
determining a similarity between the respective set of characteristic keywords for each of the projects to conversational data of a conversation of a meeting between two or more users;
assigning the meeting to a given project of the projects as a project entity based on the determined similarity for the given project; and
personalizing content to the user based on the assignment of the meeting to the project.

17. The computer-implemented method of claim 16, wherein the conversational data comprises a group of documents associated with the meeting.

18. The computer-implemented method of claim 16, further comprising activating a listening mode on a user device associated with the user based on at least one pattern formed by the group of project entities of at least one of the projects, the conversation captured by sensor data from at least one user device, the listening mode providing at least some of the conversation.

19. The computer-implemented method of claim 16, wherein the personalizing of content to the user comprises:
determining a project pattern of the project-based entity features of a set of project entities tagged with a project tag corresponding to the project, the set of project entities including the meeting; and
generating the personalized content from the project pattern.

20. The computer-implemented method of claim 16, wherein the conversation is provided as audio from at least one microphone associated with the user.

* * * * *